US012771083B2

(12) United States Patent
Song et al.

(10) Patent No.: US 12,771,083 B2
(45) Date of Patent: Oct. 20, 2026

(54) ELECTRICAL CONNECTOR AND MOUNTING METHOD THEREOF WITH IMPROVED MOUNTING FEATURES

(71) Applicant: DONGGUAN LUXSHARE TECHNOLOGIES CO., LTD, Dongguan City (CN)

(72) Inventors: Tao Song, Dongguan City (CN); Chuanqi Gong, Dongguan City (CN); Zhenxing Zheng, Dongguan City (CN)

(73) Assignee: DONGGUAN LUXSHARE TECHNOLOGIES CO., LTD, Dongguan City (CN)

( * ) Notice: Subject to any disclaimer, the term of this patent is extended or adjusted under 35 U.S.C. 154(b) by 505 days.

(21) Appl. No.: 18/226,516

(22) Filed: Jul. 26, 2023

(65) Prior Publication Data

US 2024/0154374 A1 May 9, 2024

(30) Foreign Application Priority Data

Nov. 8, 2022 (CN) ......................... 202211393349.7

(51) Int. Cl.

*H01R 27/00* (2006.01)
*H01R 12/72* (2011.01)
*H01R 13/74* (2006.01)
*H01R 43/20* (2006.01)

(52) U.S. Cl.

CPC ........... *H01R 27/00* (2013.01); *H01R 12/721* (2013.01); *H01R 13/74* (2013.01); *H01R 43/205* (2013.01)

(58) Field of Classification Search

CPC ...... H01R 12/721; H01R 27/00; H01R 13/74; H01R 13/514; H01R 12/7047; H01R 12/737; H01R 43/205

USPC .......................................................... 439/630

See application file for complete search history.

(56) References Cited

U.S. PATENT DOCUMENTS

| | | | | |
|---|---|---|---|---|
| 6,780,018 B1 * | 8/2004 | Shipe | H01R 12/721 | 439/907 |
| 7,972,180 B2 * | 7/2011 | Li | H01R 27/02 | 439/660 |
| 11,316,306 B2 * | 4/2022 | Chen | H01R 13/405 | |
| 2007/0111609 A1 * | 5/2007 | Sakamoto | H01R 13/62938 | 439/701 |

(Continued)

FOREIGN PATENT DOCUMENTS

| | | |
|---|---|---|
| CN | 102396208 A | 3/2012 |
| CN | 203747103 U | 7/2014 |

(Continued)

*Primary Examiner* — Abdullah A Riyami
*Assistant Examiner* — Amara Anderson
(74) *Attorney, Agent, or Firm* — Birch, Stewart, Kolasch & Birch, LLP

(57) ABSTRACT

An electrical connector includes an outer insulating body, a first sub-connector, an identification connector and a terminal module. The outer insulating body includes an accommodating space and a second slot located beside the accommodating space. The first sub-connector includes a first insulating body and a number of first terminals. The first insulating body includes a first slot. The outer insulating body is sleeved on the first sub-connector with the first insulating body accommodated in the accommodating space. Such arrangement simplifies the mounting of the electrical connector. A method for mounting the electrical connector is also disclosed.

20 Claims, 31 Drawing Sheets

(56) References Cited

U.S. PATENT DOCUMENTS

| | | | | |
|---|---|---|---|---|
| 2011/0250767 | A1 * | 10/2011 | Crighton | G06F 1/186 434/224 |
| 2019/0214755 | A1 | 7/2019 | Manickam | |

FOREIGN PATENT DOCUMENTS

| | | | |
|---|---|---|---|
| CN | 110190431 | A | 8/2019 |
| CN | 111029828 | A | 4/2020 |
| CN | 111525324 | A | 8/2020 |
| CN | 212968345 | U | 4/2021 |
| CN | 215184673 | U | 12/2021 |
| CN | 114256660 | A | 3/2022 |
| TW | M240711 | U | 8/2004 |

* cited by examiner

ELECTRICAL CONNECTOR AND MOUNTING METHOD THEREOF WITH IMPROVED MOUNTING FEATURES

CROSS-REFERENCE TO RELATED APPLICATION

This patent application claims priority of a Chinese Patent Application No. 202211393349.7, filed on Nov. 8, 2022 and titled "ELECTRICAL CONNECTOR AND MOUNTING METHOD THEREOF", the entire content of which is incorporated herein by reference.

TECHNICAL FIELD

The present disclosure relates to an electrical connector and a mounting method thereof, which belongs to the technical field of connectors.

BACKGROUND

An electrical connector in the related art includes a plurality of sub-connectors. However, these sub-connectors usually share an insulating body. Each sub-connector includes a plurality of conductive terminals. When the conductive terminals of these sub-connectors need to be mounted to a circuit board at the same time, the mounting is difficult and the yield rate is low.

In addition, with the continuous development of connector technologies, connectors with the same or similar appearance may be matched with different mating electronic components (such as electronic cards). Therefore, it is necessary to design an identification function for the electrical connector to improve the mating accuracy.

SUMMARY

An object of the present disclosure is to provide an electrical connector with improved structure and a mounting method thereof.

In order to achieve the above object, the present disclosure adopts the following technical solution: an electrical connector, including: an outer insulating body, the outer insulating body including an accommodating space and a second slot located beside the accommodating space along a first direction; a first sub-connector, the first sub-connector including a first insulating body and a plurality of first terminals fixed to the first insulating body; the first insulating body defining a first slot; each first terminal including a first mating portion extending into the first slot and a first tail portion configured to be mounted on a circuit board; the outer insulating body being sleeved on the first sub-connector; the first insulating body being accommodated in the accommodating space; the first slot and the second slot being arranged along the first direction; and a terminal module, the terminal module including a plurality second terminals and a plurality of cables connected to the plurality of second terminals, each second terminal including a second mating portion extending into the second slot and a second tail portion connected with a corresponding cable.

In order to achieve the above object, the present disclosure adopts the following technical solution: an electrical connector, including: a sub-connector, the sub-connector including an insulating body and a plurality of conductive terminals, the insulating body defining a slot, each conductive terminal including a tail portion and a mating portion protruding into the slot, the slot being configured to receive an electronic card; and an identification connector, the identification connector including a plurality of identifying conductive terminals and a conductive element; each identifying conductive terminal including a connecting portion; the plurality of identifying conductive terminals being configured to be in contact with a circuit board; wherein the conductive element connects the connecting portions of at least two of the identifying conductive terminals among the plurality of identifying conductive terminals, so as to transmit an identification signal to the circuit board.

In order to achieve the above object, the present disclosure adopts the following technical solution: a method for mounting an electrical connector to a circuit board, the electrical connector including: an outer insulating body, the outer insulating body including an accommodating space and a second slot located beside the accommodating space along a first direction; a first sub-connector, the first sub-connector including a first insulating body and a plurality of first terminals fixed to the first insulating body; the first insulating body defining a first slot; each first terminal including a first mating portion extending into the first slot and a first tail portion configured to be mounted on the circuit board; the outer insulating body being sleeved on the first sub-connector; the first insulating body being accommodated in the accommodating space; the first slot and the second slot being arranged along the first direction; and a terminal module, the terminal module including a plurality second terminals and a plurality of cables connected to the plurality of second terminals, each second terminal including a second mating portion extending into the second slot and a second tail portion connected with a corresponding cable;

the method including steps of

- S1, mounting the first tail portions of the first terminals of the first sub-connector on the circuit board;
- S2, assembling the terminal module into the outer insulating body; and
- S3, mounting the outer insulating body together with the terminal module on the circuit board, wherein the first insulating body is accommodated in the accommodating space.

Compared with the prior art, the present disclosure pre-mounts the first sub-connector on the circuit board; and then sleeves the outer insulating body on the first sub-connector to make the first sub-connector be accommodated in the accommodating space, which simplifies mounting the electrical connector to the circuit board. Besides, by providing the identification connector and connecting the connecting portions of at least two identifying conductive terminals among the plurality of identifying conductive terminals through the conductive element, so as to transmit the identification signal to the circuit board, which expands the identification function of the electrical connector.

DETAILED DESCRIPTION

Figure 1:
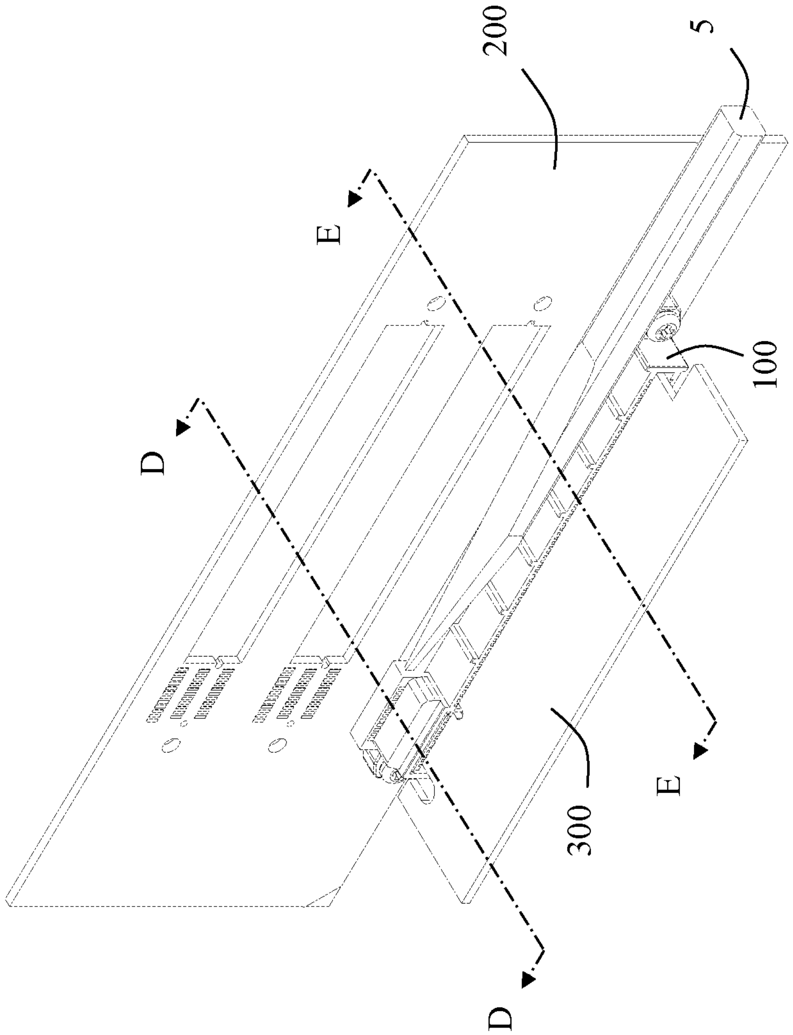
FIG. 1 is a schematic perspective view of an electrical connector assembly in accordance with an embodiment of the present disclosure.
Figure 2:
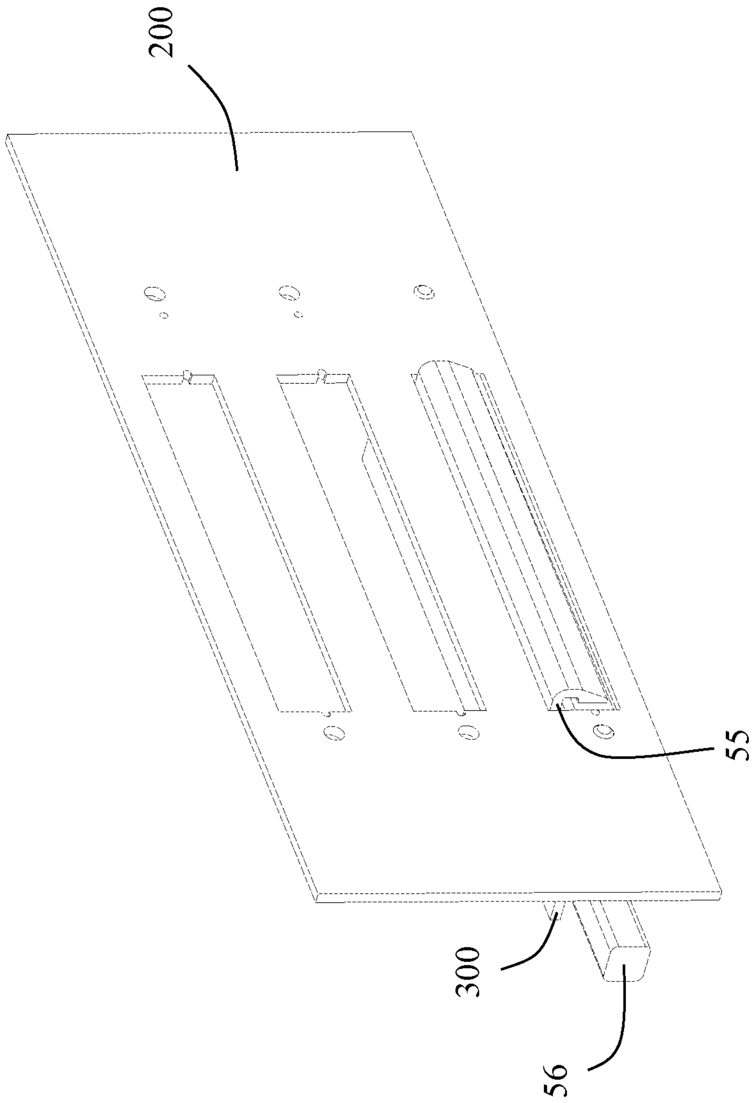
FIG. 2 is a schematic perspective view of FIG. 1 at another angle.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 6, the present disclosure discloses an electrical connector 100 for being mounted on a circuit board 200 and mating with an electronic card 300. The circuit board 200 includes a mounting surface 201, a mounting opening 202 extending through the mounting surface 201, a plurality of conductive pads 203 exposed on the mounting surface 201, a first mounting hole 204 located on a side of the mounting opening 202 away from the plurality of conductive pads 203, and a second mounting hole 205 located on a side of the plurality of conductive pads 203 away from the mounting opening 202. In the illustrated embodiment of the present disclosure, the plurality of conductive pads 203 are located beside the mounting opening 202. The plurality of conductive pads 203 include a first row of conductive pads 2031 arranged at intervals along the first direction A1-A1, a second row of conductive pads 2032 arranged at intervals along the first direction A1-A1, and a third row of conductive pads 2033 arranged at intervals along the first direction A1-A1. The first row of conductive pads 2031, the second row of conductive pads 2032 and the third row of conductive pads 2033 are arranged at intervals along a second direction A2-A2 which is perpendicular to the first direction A1-A1. In the illustrated embodiment of the present disclosure, the number of the first row of conductive pads 2031 is the same as the number of the second row of conductive pads 2032. The first row of conductive pads 2031 and the second row of conductive pads 2032 are aligned and disposed along the second direction A2-A2. The number of the third row of conductive pads 2033 is greater than the number of the first row of conductive pads 2031.

In the illustrated embodiment of the present disclosure, the electrical connector 100 is a card edge connector for insertion of the electronic card 300. The electronic card 300 includes a base 301, a first insertion portion 302 extending from the base 301 and a second insertion portion 303 extending from the base 301. The first insertion portion 302 and the second insertion portion 303 are disposed at intervals along the first direction A1-A1. The electronic card 300 further includes a cutout 304 located between the first insertion portion 302 and the second insertion portion 303 along the first direction A1-A1. In the illustrated embodiment of the present disclosure, the cutout 304 is a U-shaped opening. Widths of the first insertion portion 302 and the second insertion portion 303 along the first direction A1-A1 are different to prevent wrong insertion. A plurality of first metal pads 3021 are disposed on at least one surface of the first insertion portion 302. A plurality of second metal pads 3031 are disposed on at least one surface of the second insertion portion 303. In the illustrated embodiment of the present disclosure, the plurality of first metal pads 3021 are provided on two opposite surfaces of the first insertion portion 302. The plurality of second metal pads 3031 are provided on opposite surfaces of the second insertion portion 303.

In the illustrated embodiment of the present disclosure, the electrical connector 100 includes a first sub-connector 101, a second sub-connector 102 and an identification connector 103. In the illustrated embodiment of the present disclosure, the electrical connector 100 includes an outer insulating body 1. The outer insulating body 1 is a component of the second sub-connector 102 and the identification connector 103 (details will be described later). The outer insulating body 1 includes a first mounting flange 18 and a second mounting flange 19 located on two sides thereof. The first mounting flange 18 defines a first through hole 181 aligned with the first mounting hole 204. The second mounting flange 19 defines a second through hole 191 aligned with the second mounting hole 205. The electrical connector 100 also includes a first fastener 104 (e.g. a bolt) passing through the first through hole 181 and the first mounting hole 204 to fix one side of the outer insulating body 1 to the circuit board 200; and a second fastener 105 (e.g. a bolt) passing through the second through hole 191 and the second mounting hole 205 to fix the other side of the outer insulating body 1 to the circuit board 200.

Referring to FIG. 7 to FIG. 19, the outer insulating body 1 includes a first base 11, a second base 12 located on a side (e.g. a left side) of the first base 11 along the first direction A1-A1, and a third base 13 is located on another side (e.g. an upper side) of the first base 11 along the second direction A2-A2. In the illustrated embodiment of the present disclosure, the first base 11 is integrally formed with the second base 12; and the third base 13 is integrally formed with the first base 11.

Figure 12:
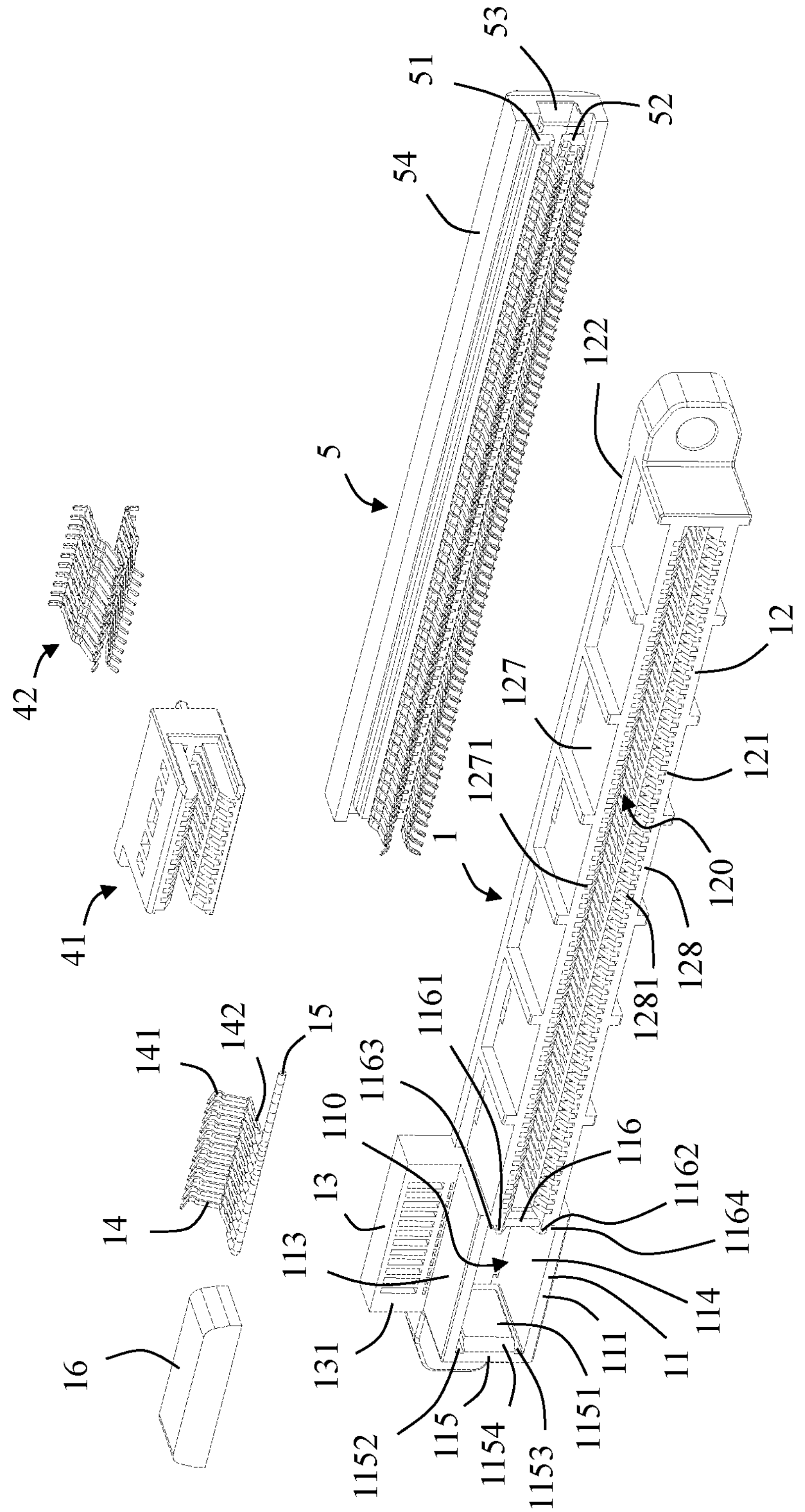
FIG. 12 is a further partial perspective exploded view of FIG. 8.

Referring to FIG. 12, the first base 11 includes a first mating surface 111, a first installation surface 112 opposite to the first mating surface, and an accommodating space 110 extending through the first mating surface 111 and the first installation surface 112. The first base 11 further includes a first top wall 113, a first bottom wall 114, a first side wall 115 and a second side wall 116. The accommodating space 110 is jointly enclosed by the first top wall 113, the first bottom wall 114, the first side wall 115 and the second side wall 116.

Figure 17:
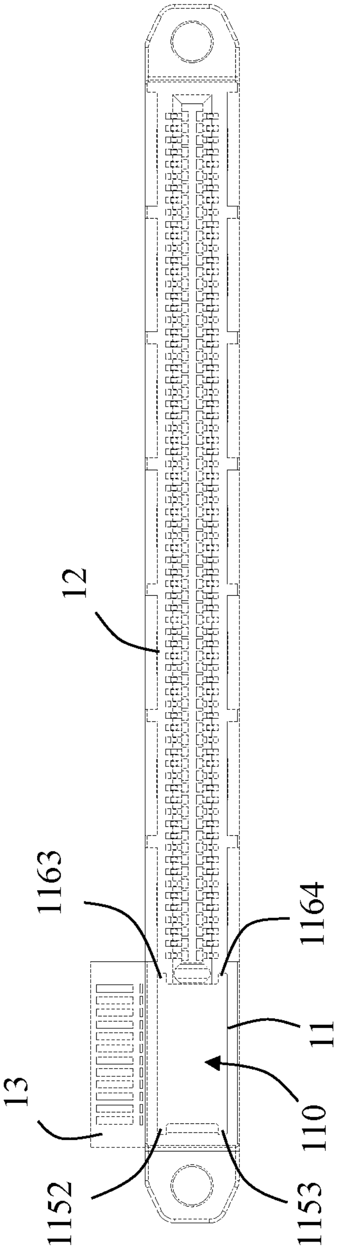
FIG. 17 is a front view of FIG. 16.
Figure 18:
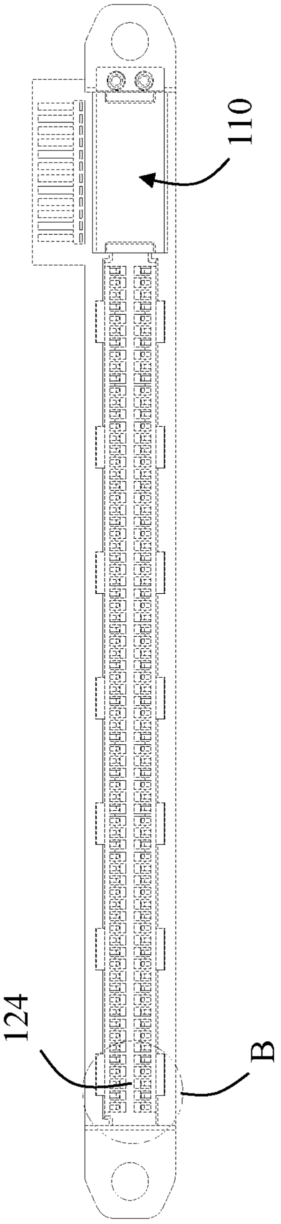
FIG. 18 is a rear view of FIG. 16.
Figure 19:
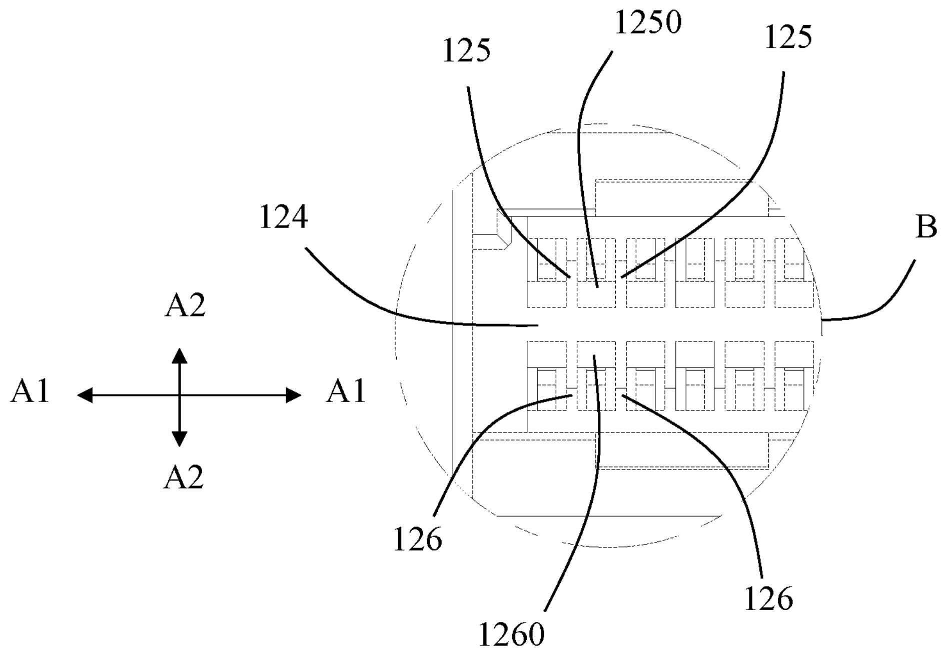
FIG. 19 is a partially enlarged view of a circled portion B in FIG. 18.
Figure 20:
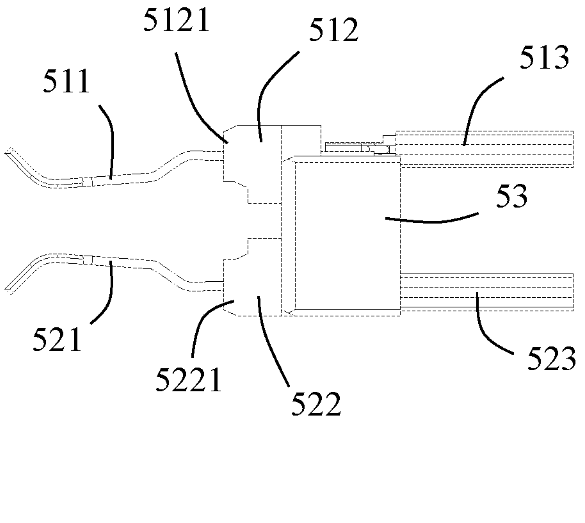
FIG. 20 is a side view of a terminal module in accordance with a first embodiment thereof.
Figure 21:
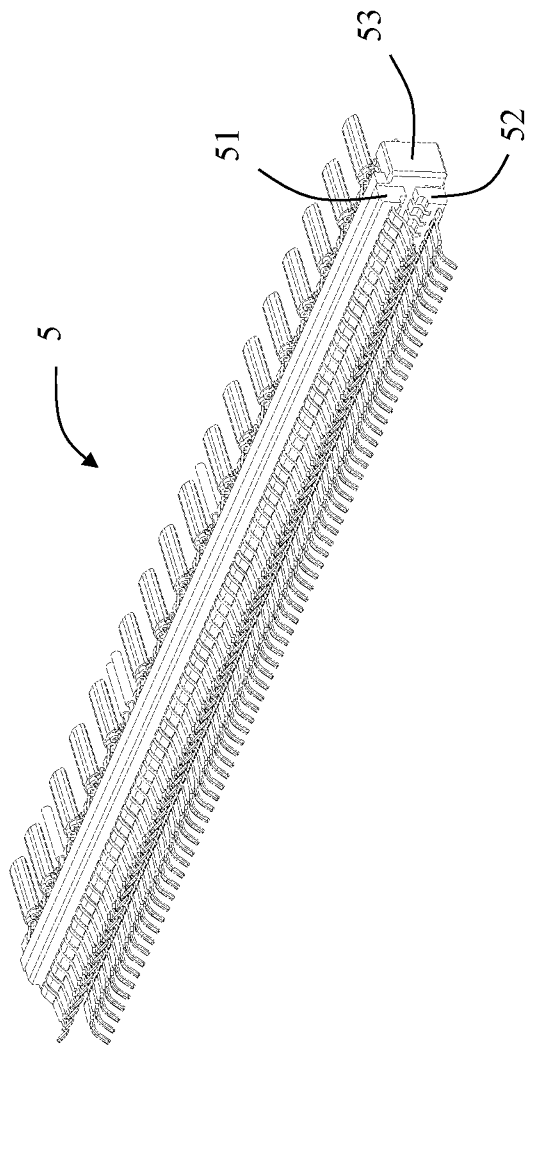
FIG. 21 is a schematic perspective view of the terminal module in FIG. 20.
Figure 22:
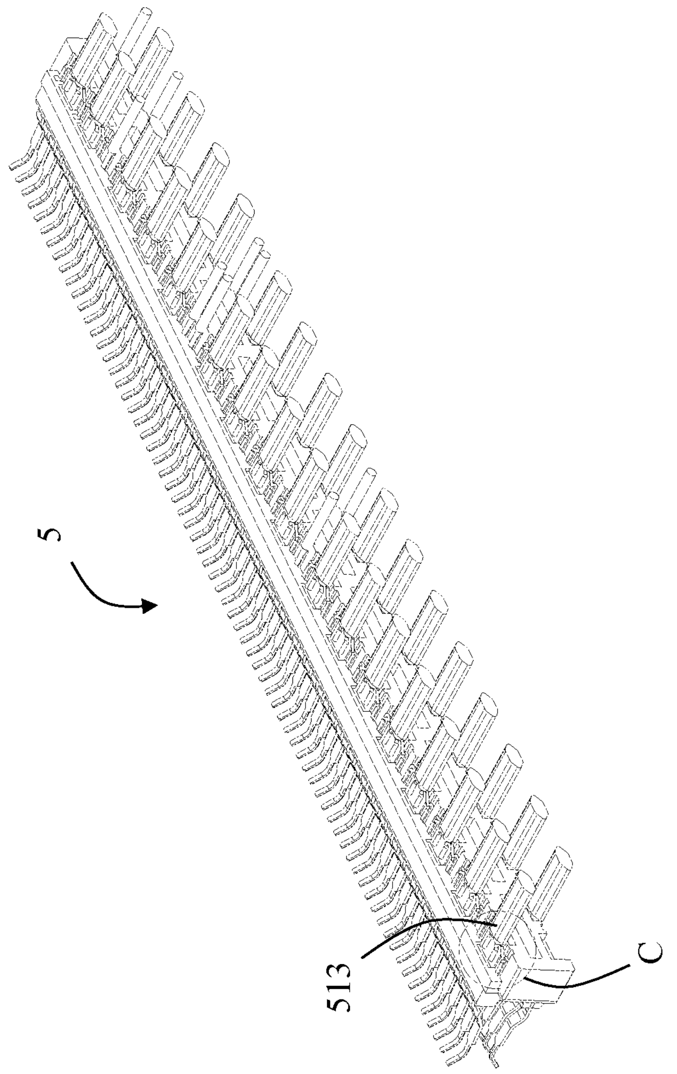
FIG. 22 is a schematic perspective view of FIG. 21 at another angle.

Referring to FIG. 12 and FIG. 17, in the embodiment shown in the present disclosure, the first sidewall 115 includes a first protrusion 1151 protruding toward the second sidewall 116 and protruding into the accommodating space 110. The first base 11 includes a first guide slot 1152 located between an upper surface of the first protrusion 1151 and the first top wall 113, and a third guide slot 1153 located between a lower surface of the first protrusion 1151 and the first bottom wall 114. A front end of the first protrusion 1151 is further provided with a first inclined surface 1154 to guide insertion of the electronic card 300.

Figure 36:
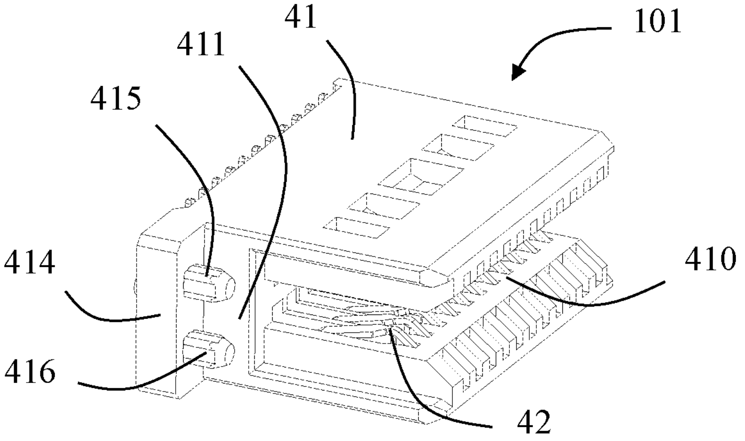
FIG. 36 is a perspective view of the first sub-connector in FIG. 4 at another angle.

The second side wall 116 is provided with a second protrusion 1161 protruding toward the first side wall 115 and protruding into the accommodating space 110; and a third protrusion 1162 protruding toward the first sidewall 115 and protruding into the accommodating space 110. The first base 11 includes a second guide slot 1163 located between an upper surface of the second protrusion 1161 and the first top wall 113, and a fourth guide slot 1164 located between a lower surface of the third protrusion 1162 and the first bottom wall 114. In the illustrated embodiment of the present disclosure, the first guide slot 1152 and the second guide slot 1163 are located at the same height; and the third guide slot 1153 and the fourth guide slot 1164 are located at the same height. Referring to FIG. 36, the first base 11 of the outer insulating body 1 further includes a first fixing hole 118 and a second fixing hole 119 at a rear end thereof. The first fixing hole 118 and the second fixing hole 119 are disposed at intervals along the second direction A2-A2. The first fixing hole 118 and the second fixing hole 119 are exposed in the accommodating space 110.

Referring to FIG. 16 to FIG. 19, the second base 12 includes a second mating surface 121, a second installation surface 122 opposite to the second mating surface 121, a second slot 120 extending forwardly through the second mating surface 121, and an installation space 123 extending backwardly through the second installation surface 122. The second base 12 further includes a middle transverse wall 124 exposed backwardly in the installation space 123, a plurality of first fence portions 125 protruding upwardly from the middle transverse wall 124 along the second direction A2-A2 and arranged at intervals along the first direction A1-A1, and a plurality of second fence portions 126 protruding downwardly from the middle transverse wall 124 along the second direction A2-A2 and arranged at intervals along the first direction A1-A1. A plurality of first receiving grooves 1250 are provided, in which each first receiving groove 1250 is disposed between two adjacent first fence portions 125. The first receiving grooves 1250 are disposed at intervals along the first direction A1-A1. A plurality of second receiving grooves 1260 are provided, in which each second receiving groove 1260 is disposed between two adjacent second fence portions 126. The second receiving grooves 1260 are arranged at intervals along the first direction A1-A1.

The second slot 120 is configured to receive the second insertion portion 303 of the electronic card 300. In the illustrated embodiment of the present disclosure, the first base 11 and the second base 12 share the second side wall 116. The second side wall 116 is used as a positioning wall for being received in the cutout 304 of the electronic card 300 so as to prevent the electronic card 300 from being reversely inserted. Of course, in other embodiments, the positioning wall may not be shared. For example, the first base 11 is provided with a first positioning wall, the second base 11 is provided with a second positioning wall, and the first positioning wall and the second positioning wall are received in the cutout 304 together. In other embodiments, the positioning wall can also be made separately from the first base 11 and the second base 12, and the positioning wall is assembled to the first base 11 and/or the second base 12, which can also achieve the purpose of preventing the electronic card 300 from being reversely/wrongly inserted.

In the illustrated embodiment of the present disclosure, the second base 12 further includes a second top wall 127 and a second bottom wall 128. The second slot 120 is located between the second top wall 127 and the second bottom wall 128. The second top wall 127 defines a plurality of third terminal receiving grooves 1271 arranged at intervals along the first direction A1-A1. The second bottom wall 128 defines a plurality of fourth terminal receiving grooves 1281 arranged at intervals along the first direction A1-A1.

The third base 13 is provided with a front end surface 131, a third installation surface 132 opposite to the front end surface 131, and a plurality of slits 133 arranged at intervals and extending backwardly through the third installation surface 132.

Figure 4:
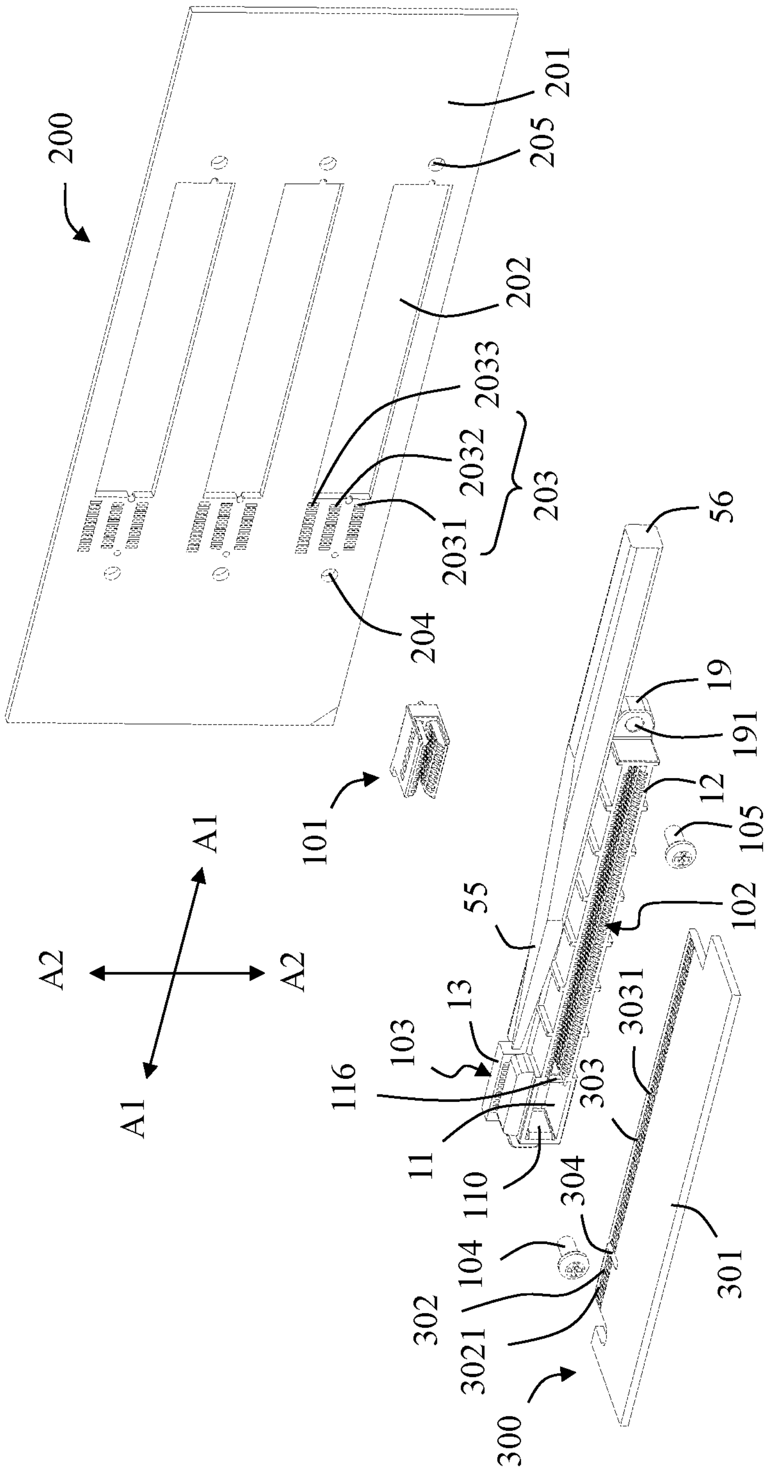
FIG. 4 is a further partial perspective exploded view of FIG. 3.
Figure 5:
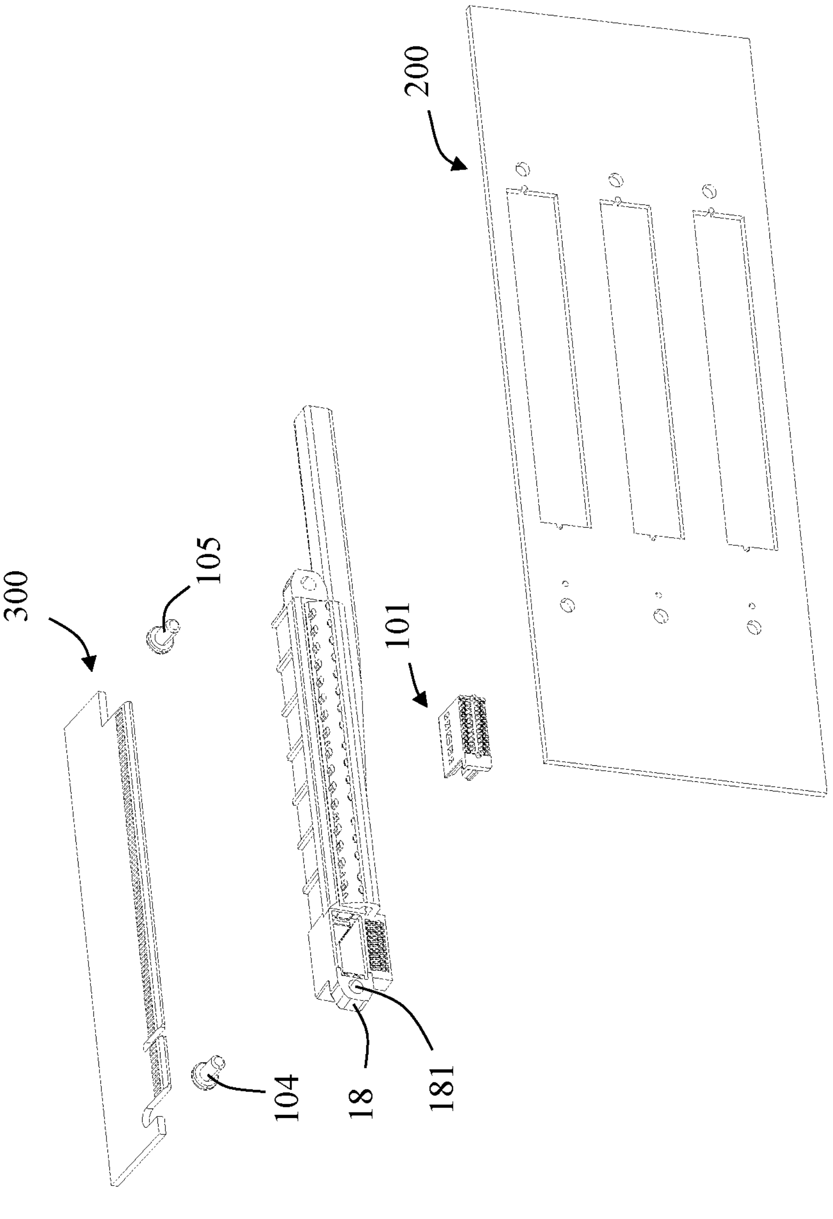
FIG. 5 is a partial perspective exploded view of FIG. 4 at another angle.
Figure 13:
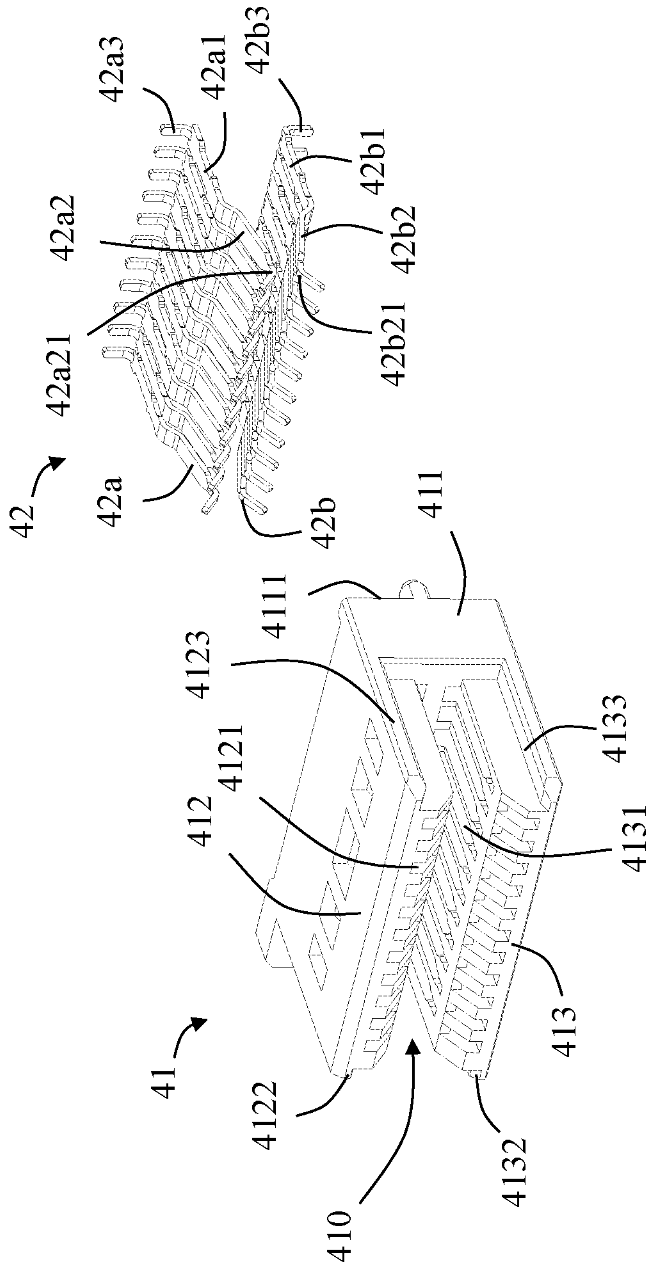
FIG. 13 is a partial perspective exploded view of a first sub-connector.

Referring to FIG. 4 and FIG. 13, the first sub-connector 101 includes a first insulating body 41 and a plurality of first terminals 42 fixed to the first insulating body 41.

In the illustrated embodiment of the present disclosure, the first insulating body 41 is roughly U-shaped, and includes a rear end portion 411, a first extension wall 412 extending forwardly from a top of the rear end portion 411, a second extension wall 413 extending forwardly from a bottom of the rear end portion 411, and a first slot 410 located between the first extension wall 412 and the second extension wall 413. The first slot 410 is configured to receive the first insertion portion 302 of the electronic card 300. In the illustrated embodiment of the present disclosure, the first slot 410 and the second slot 120 have different widths along the first direction A1-A1.

In the illustrated embodiment of the present disclosure, the rear end portion 411 is provided with a first rear end surface 4111. The first extension wall 412 defines a plurality of first terminal receiving grooves 4121. The second extension wall 413 defines a plurality of second terminal receiving grooves 4131. The plurality of first terminal receiving grooves 4121 and the plurality of second terminal receiving grooves 4131 are in communication with the first slot 410. The first extension wall 412 has a first installation rib 4122 and a second installation rib 4123 which are located on two sides thereof. The second extension wall 413 has a third installation rib 4132 and a fourth installation rib 4133 which are located on two sides thereof. The first insulating body 41 further includes a protruding wall 414 connected to the rear end portion 411, a first post 415 protruding forwardly from the protruding wall 414, and a second post 416 protruding forwardly from the protruding wall 414. The first post 415 is in interference fit with the first fixing hole 118, and the second post 416 is in interference fit with the second fixing hole 119, so as to improve that when the first sub-connector 101 is received in the accommodating space 110, the first insulating body 41 and the first base 11 can be tightly fixed. In the illustrated embodiment of the present disclosure, the first post 415 and the second post 416 are provided with abutment ribs on an outside so as to enhance the interference force with the first base 11.

In the embodiment shown in the present disclosure, the plurality of first terminals 42 include a plurality of first conductive terminals 42*a* fixed to the first insulating body 41 and a plurality of second conductive terminals 42*b* fixed to the first insulating body 41.

In an embodiment of the present disclosure, the plurality of first conductive terminals 42*a* and the plurality of second conductive terminals 42*b* are assembled and fixed to the first insulating body 41. In the illustrated embodiment of the present disclosure, the first conductive terminal 42*a* and the second conductive terminal 42*b* are disposed symmetrically. Each first conductive terminal 42*a* includes a first fixing portion 42*a*1 fixed to the rear end portion 411, a first elastic arm 42*a*2 extending forwardly from one end of the first fixing portion 42*a*1, and a first soldering portion 42*a*3 bent from the other end of the first fixing portion 42*a*1. The first elastic arm 42*a*2 has a first contact portion 42*a*21 extending into the first slot 410.

Similarly, each second conductive terminal 42*b* includes a second fixing portion 42*b*1 fixed to the rear end portion 411, a second elastic arm 42*b*2 extending forwardly from one end of the second fixing portion 42*b*1, and a second soldering portion 42*b*3 bent from the other end of the second fixing portion 42*b*1. The second elastic arm 42*b*2 has a second contact portion 42*b*21 extending into the first slot 410.

The first contact portion 42*a*21 and the second contact portion 42*b*21 are located on two sides (for example, an upper side and a lower side) of the first slot 410, respectively, so as to better hold the first insertion portion 302 of the electronic card 300. The first soldering portions 42*a*3 and the second soldering portions 42*b*3 are soldered or welded to the first row of conductive pads 2031 and the second row of conductive pads 2032, respectively, by surface mount technology (SMT). In the illustrated embodiment of the present disclosure, bent directions of the first soldering portions 42*a*3 and the second soldering portions 42*b*3 are opposite. That is, although each of the first soldering portions 42*a*3 and the second soldering portions 42*b*3 is in a shape of a flat plate, an extending direction of the first soldering portion 42*a*3 is opposite to an extending direction of the second soldering portion 42*b*3. With such arrangement, it is beneficial to increase distances between the first soldering portions 42*a*3 and the second soldering portions 42*b*3, thereby reducing the risk of short circuit caused by too short distances.

Referring to FIG. 4 and FIG. 12, the second sub-connector 102 includes the second base 12 of the outer insulating body 1 and a terminal module 5 mounted to the second base 12. The terminal module 5 includes a first terminal module 51 and a second terminal module 52.

Referring to FIG. 20 to FIG. 27, in the embodiment shown in the present disclosure, the first terminal module 51 includes a plurality of third conductive terminals 511, a first insulating block 512 fixing the third conductive terminals 511, and a plurality of first cables 513 connected to the plurality of third conductive terminals 511. Each third conductive terminal 511 includes a third fixing portion 5111 fixed in the first insulating block 512, a third elastic arm 5112 extending from one end of the third fixing portion 5111, and a third soldering portion 5113 extending from the other end of the third fixing portion 5111. The third elastic arm 5112 passes through a corresponding first receiving groove 1250 to extend into the second slot 120. The third elastic arm 5112 includes a third contact portion 5112*a* located in the second slot 120. In the illustrated embodiment of the present disclosure, the third conductive terminals 511 are insert-molded with the first insulating block 512 to form a whole.

Figure 23:
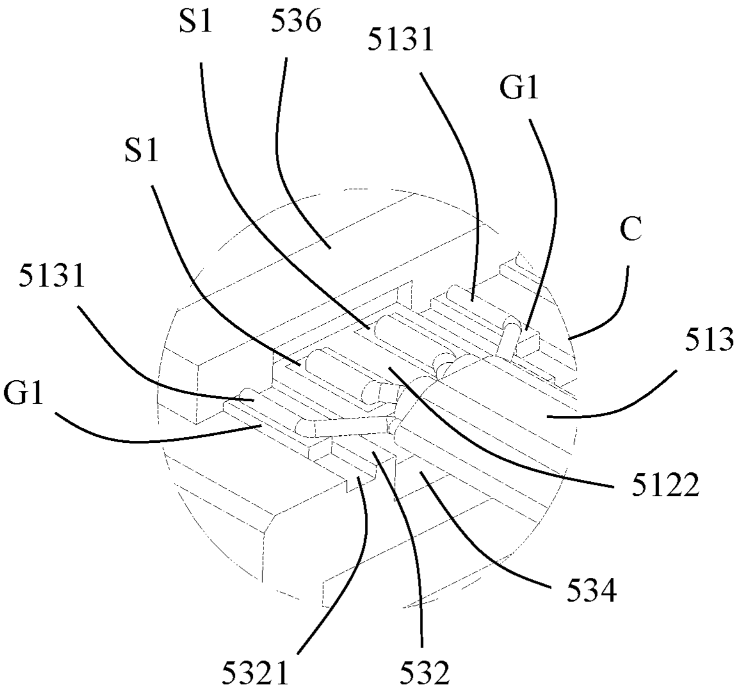
FIG. 23 is a partially enlarged view of a circled portion C in FIG. 22.

Referring to FIG. 23, in the embodiment illustrated in the present disclosure, the plurality of third conductive terminals 511 includes a plurality of first signal terminals S1 and a plurality of first ground terminals G1. Preferably, two adjacent first signal terminals S1 form a pair of first differential signal terminals, so as to increase the speed of signal transmission. At least one side of each pair of first differential signal terminals is provided with one first ground terminal G1. Preferably, each side of each pair of first differential signal terminals is provided with one first ground terminal G1, so as to improve the quality of signal transmission.

Similarly, the second terminal module 52 includes a plurality of fourth conductive terminals 521, a second insulating block 522 fixing the fourth conductive terminals 521, and a plurality of second cables 523 connected to the plurality of fourth conductive terminals 521. Each fourth conductive terminal 521 includes a fourth fixing portion 5211 fixed in the second insulating block 522, a fourth elastic arm 5212 extending from one end of the fourth fixing portion 5211, and a fourth soldering portion 5213 extending from the other end of the fourth fixing portion 5211. The fourth elastic arm 5212 passes through a corresponding second receiving groove 1260 to extend into the second slot 120. The fourth elastic arm 5212 includes a fourth contact portion 5212*a* located in the second slot 120. In the illustrated embodiment of the present disclosure, the fourth conductive terminals 521 are insert-molded with the second insulating block 522 to form a whole.

Figure 24:
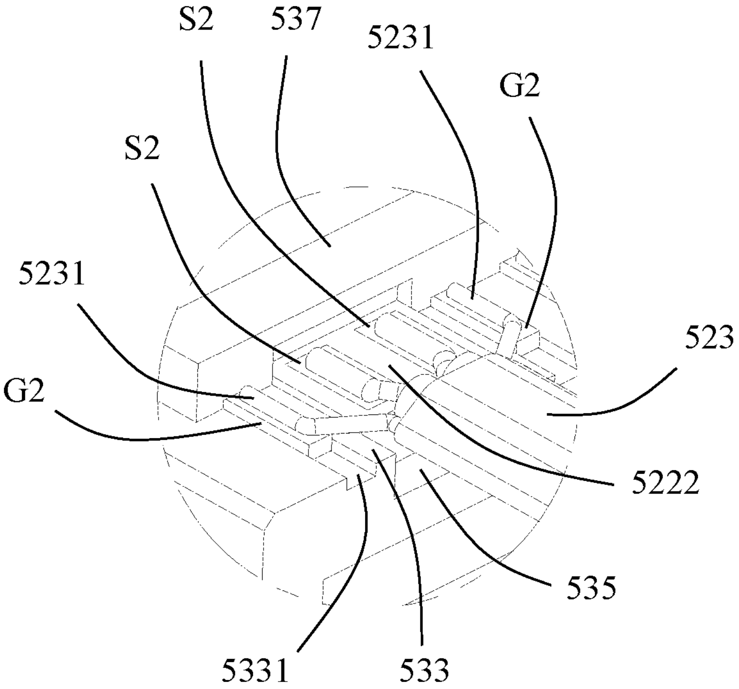
FIG. 24 is a partial enlarged view of a circled portion C of the terminal module in FIG. 22 after being turned over 180°.

Referring to FIG. 24, in the embodiment illustrated in the present disclosure, the plurality of fourth conductive terminals 521 includes a plurality of second signal terminals S2 and a plurality of second ground terminals G2. Preferably, two adjacent second signal terminals S2 form a pair of second differential signal terminals, so as to increase the speed of signal transmission. At least one side of each pair of second differential signal terminals is provided with one second ground terminal G2. Preferably, each side of each pair of second differential signal terminals is provided with one second ground terminal G2, so as to improve the quality of signal transmission.

The first insulating block 512 and the second insulating block 522 are at least partially accommodated in the installation space 123. The first insulating block 512 and/or the second insulating block 522 are positioned in contact with the middle transverse wall 124.

Specifically, in an embodiment of the present disclosure, the first insulating block 512 is further provided with a plurality of first positioning protrusions 5121 protruding forwardly and corresponding to the first receiving grooves 1250, and a plurality of first protrusions 5122 protruding backwardly. The third elastic arms 5112 protrude beyond the first positioning protrusions 5121. In an embodiment of the present disclosure, the third soldering portions 5113 of the first signal terminals S1 are exposed on the first protrusions 5122 so as to facilitate fixing with the first cables 513 by soldering or welding.

Similarly, the second insulating block 522 is further provided with a plurality of second positioning protrusions 5221 protruding forwardly and corresponding to the second receiving grooves 1260, and a plurality of second protrusions 5222 protruding backwardly. The fourth elastic arms 5212 protrude beyond the second positioning protrusions 5221. In an embodiment of the present disclosure, the fourth soldering portions 5213 of the second signal terminals S2 are exposed on the second protrusions 5222 so as to facilitate fixing with the second cables 523 by soldering or welding.

Figure 25:
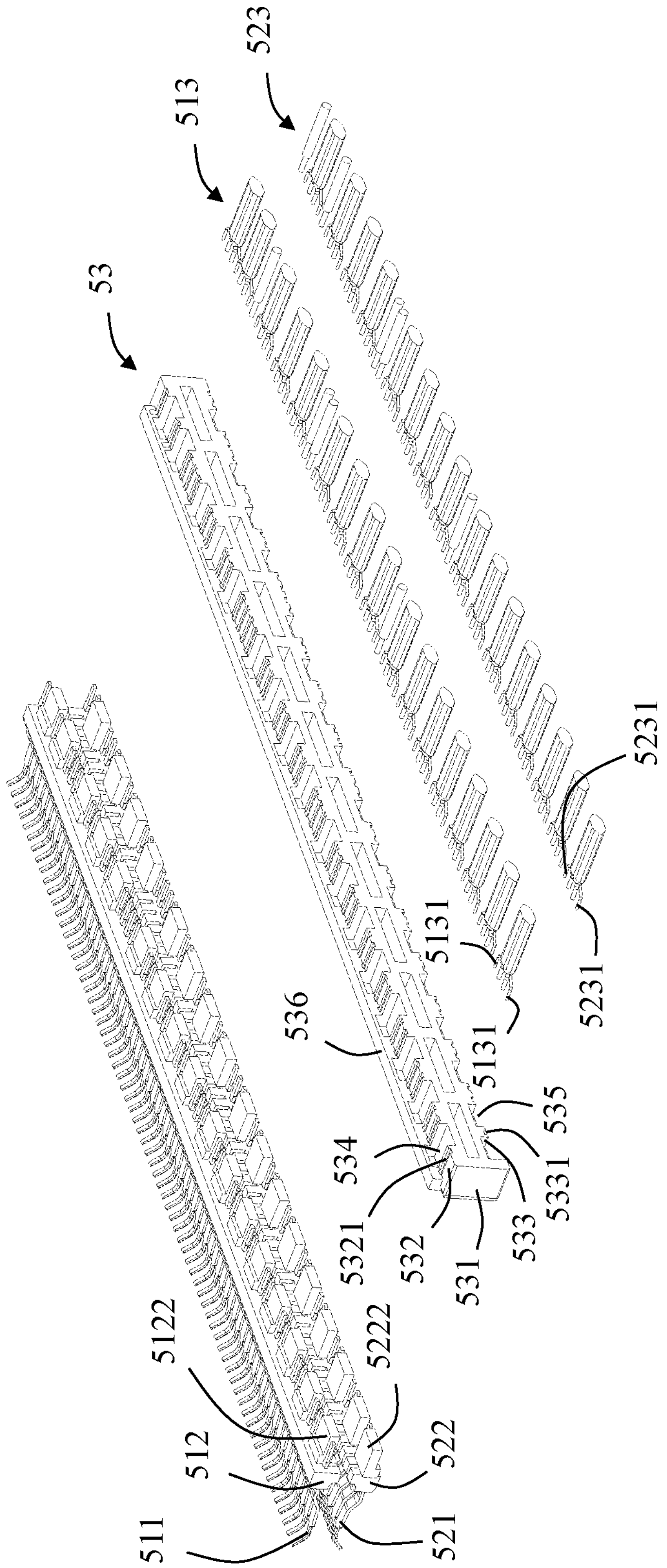
FIG. 25 is a partial perspective exploded view of the terminal module in FIG. 21.
Figure 26:
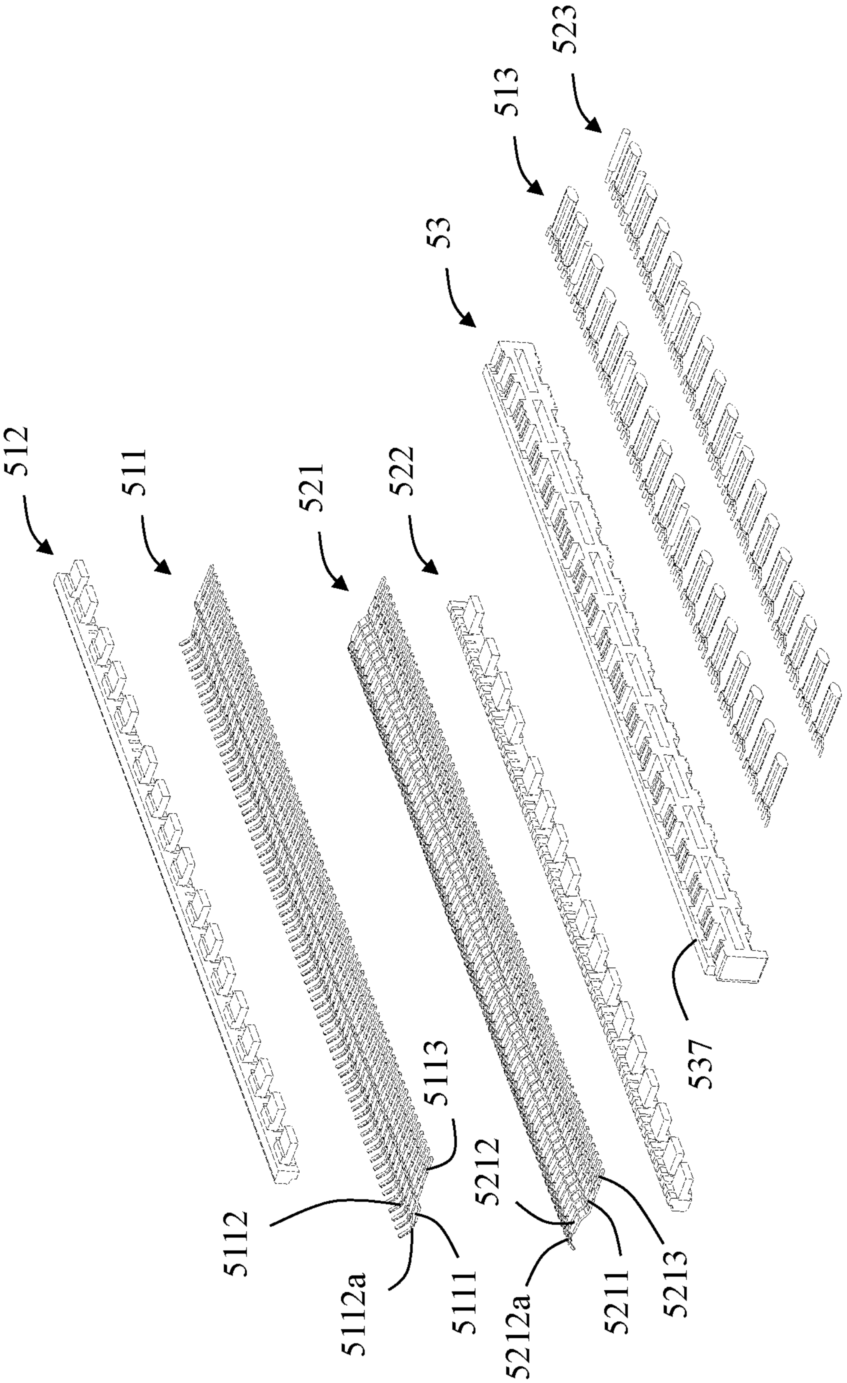
FIG. 26 is a further perspective exploded view of FIG. 25.
Figure 27:
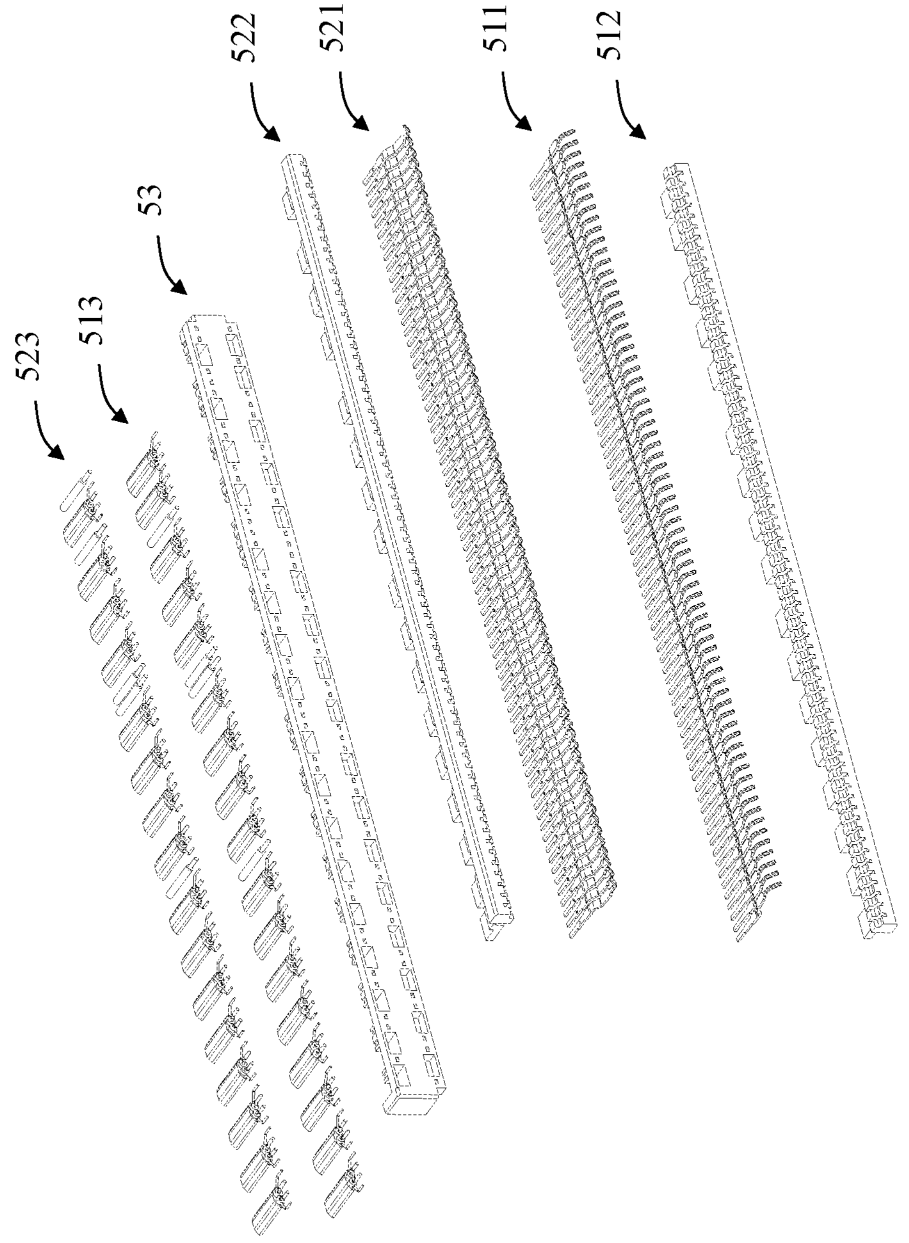
FIG. 27 is a perspective exploded view of FIG. 26 at another angle.
Figure 28:
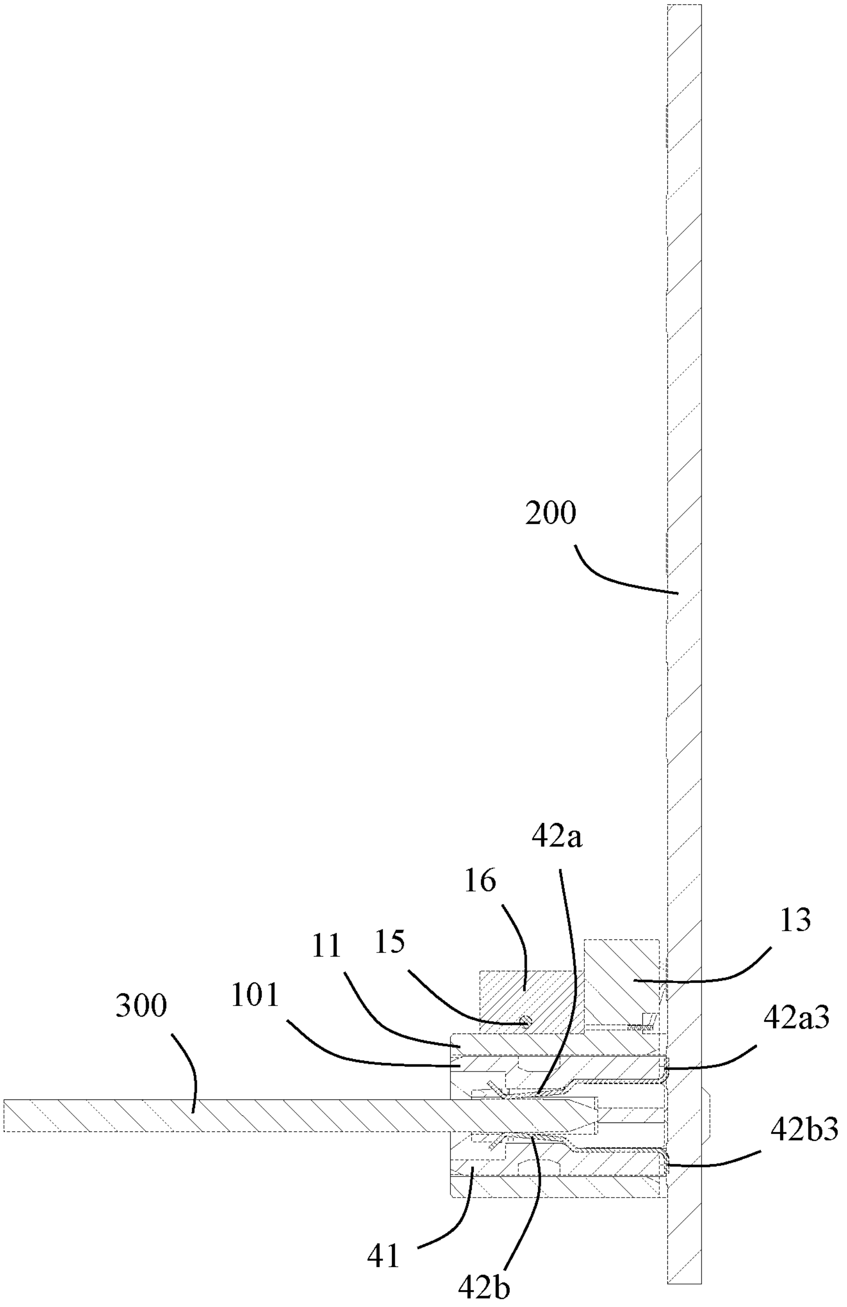
FIG. 28 is a schematic cross-sectional view taken along line D-D in FIG. 1.
Figure 29:
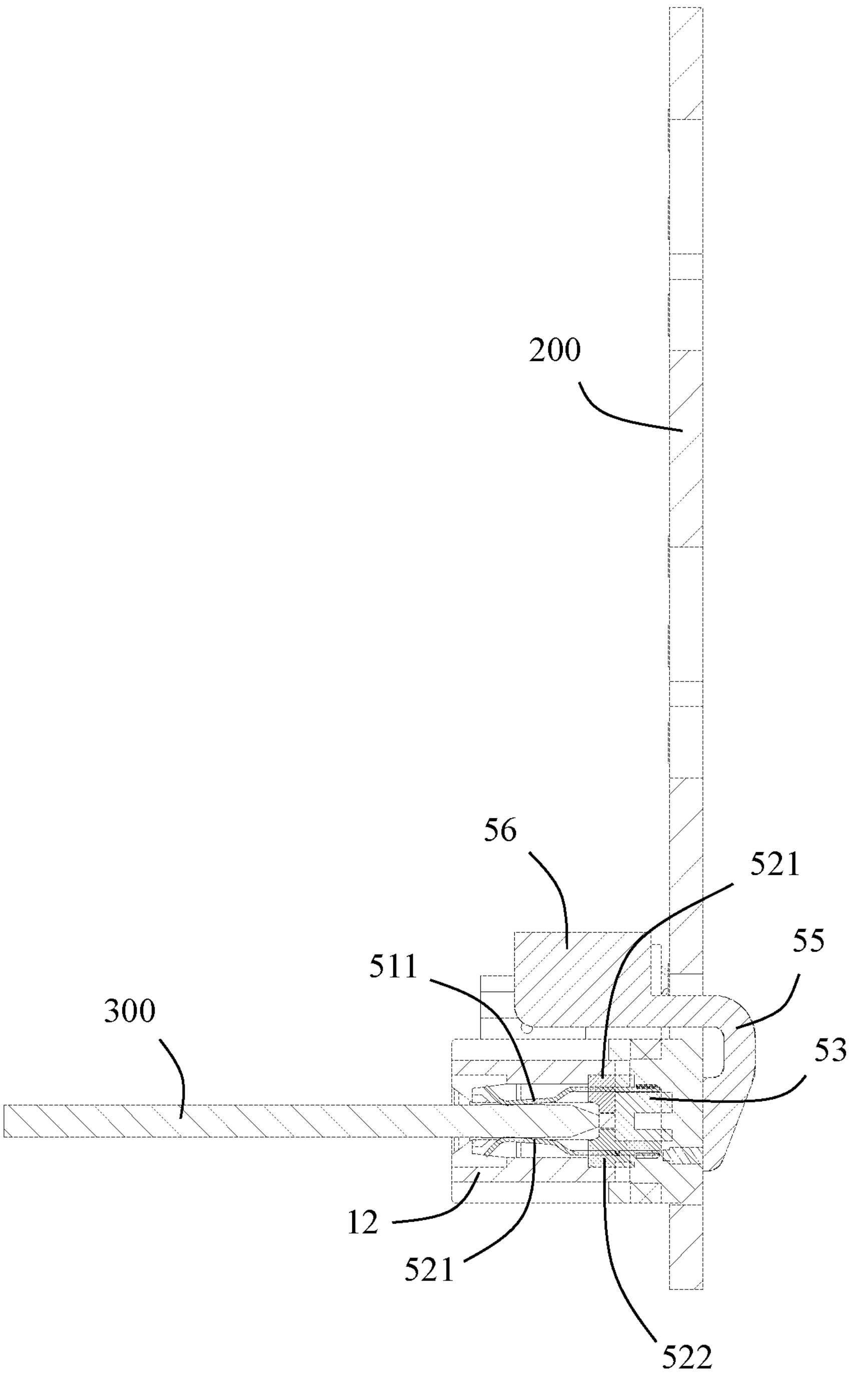
FIG. 29 is a schematic sectional view taken along line E-E in FIG. 1.
Figure 30:
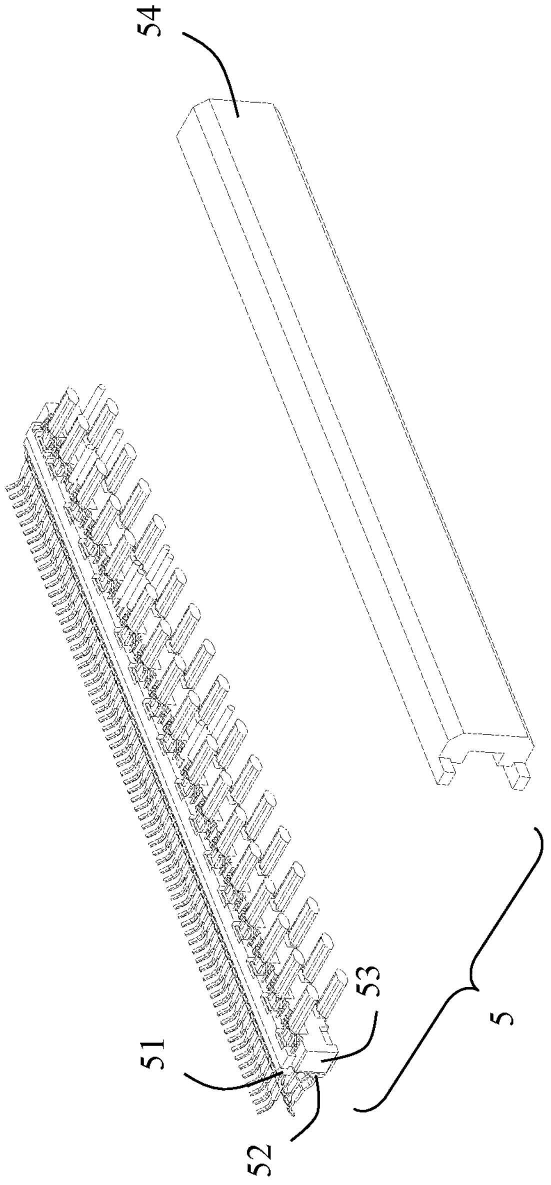
FIG. 30 is a partial perspective exploded view of the terminal module in accordance with a second embodiment thereof.
Figure 31:
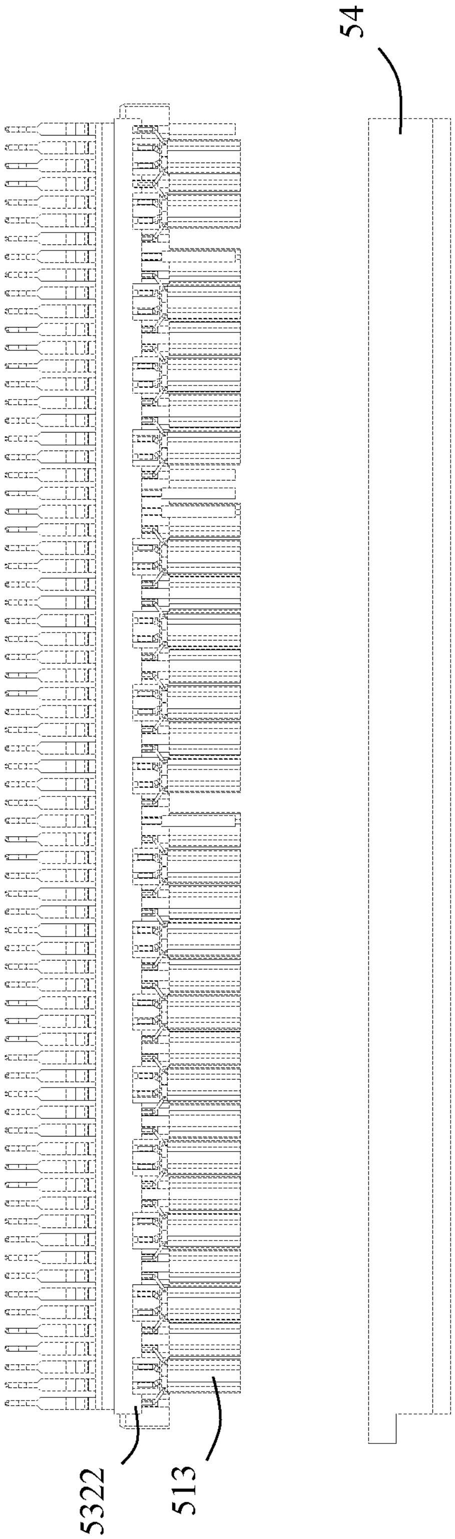
FIG. 31 is a top view of FIG. 30.
Figure 32:
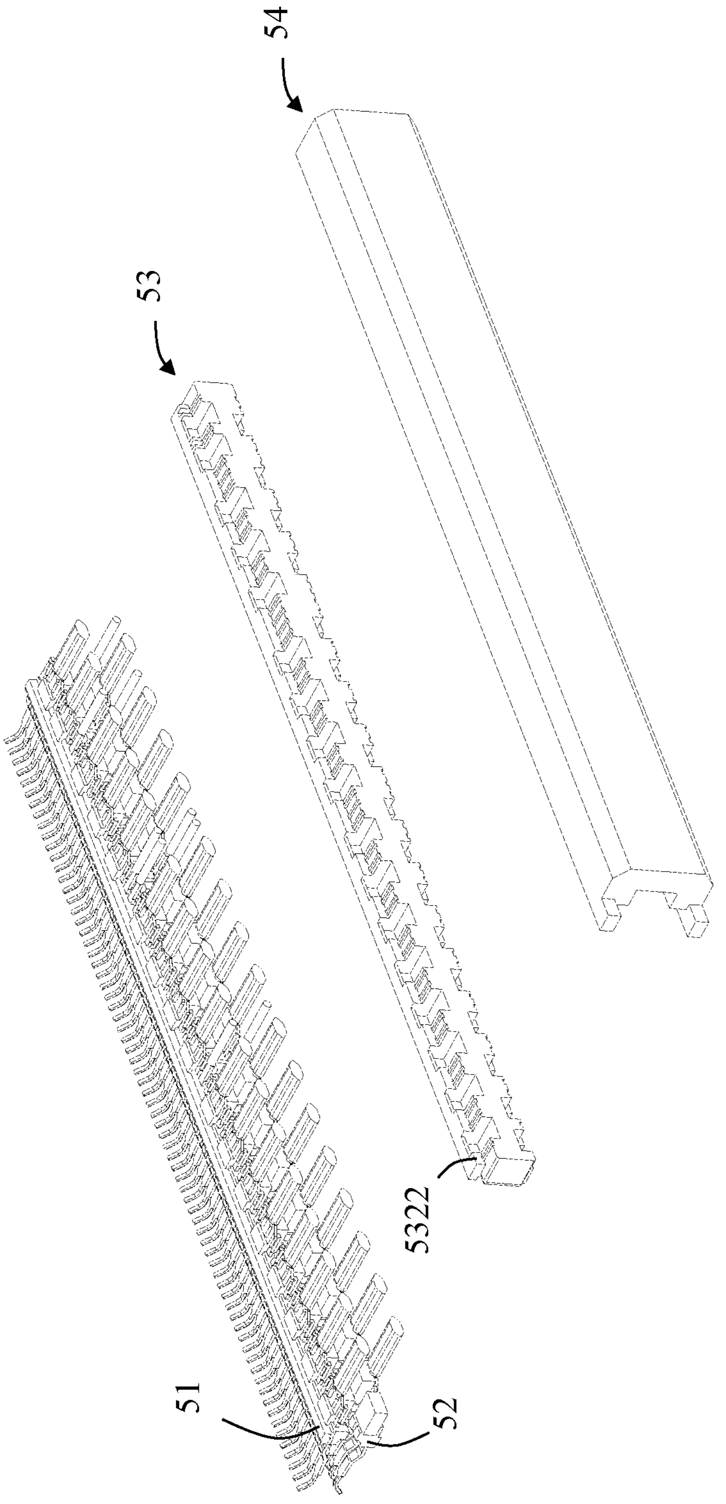
FIG. 32 is a further partial perspective exploded view of FIG. 30.
Figure 33:
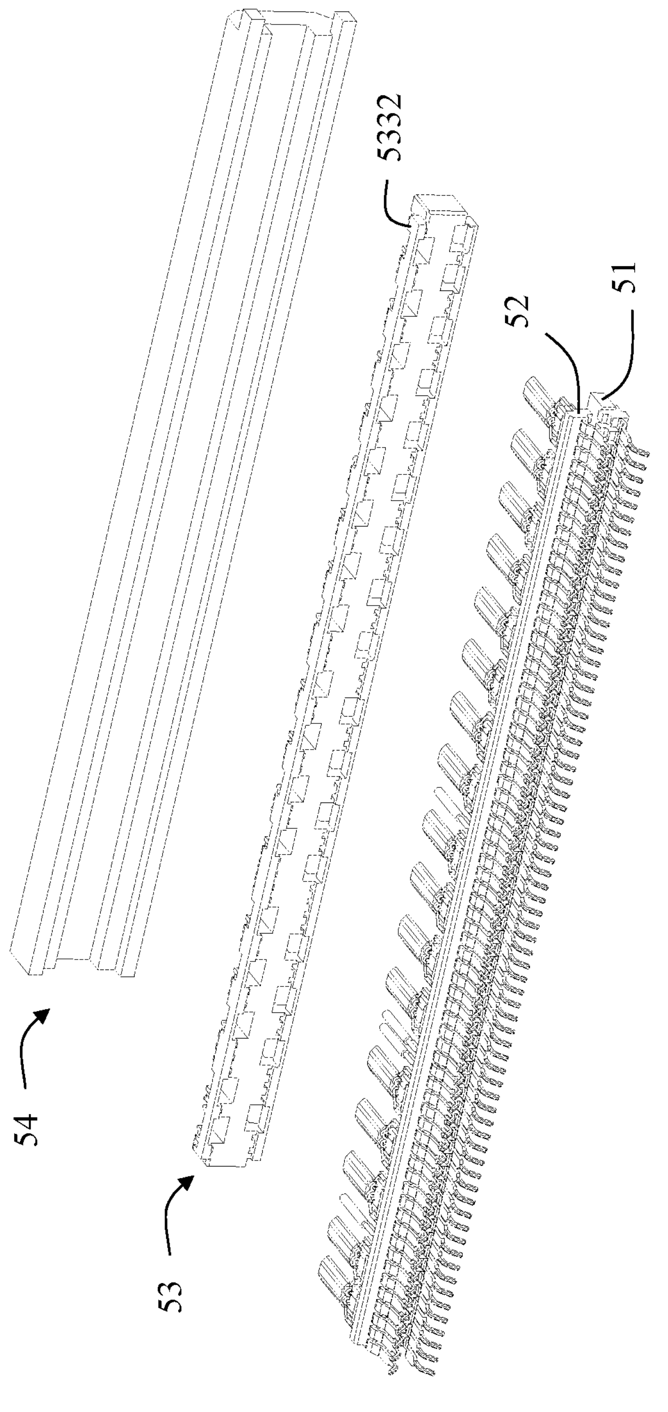
FIG. 33 is a partial perspective exploded view of FIG. 32 at another angle.

Referring to FIG. 25 to FIG. 27, in a first embodiment of the terminal module 5 disclosed in the present disclosure, the terminal module 5 further includes a metal shielding member 53 sleeved on the first insulating block 512 and the second insulating block 522. Preferably, the terminal module 5 further includes a covering insulating housing 54 overmolded on the first insulating block 512, the second insulating block 522 and the metal shielding member 53.

The metal shielding member 53 includes a main body 531, a plurality of first bosses 532 protruding upwardly from the main body 531, a plurality of second bosses 533 protruding downwardly from the main body 531, a plurality of first holding grooves 534 each located between two adjacent first bosses 532, a plurality of second locking grooves 535 each located between two adjacent second bosses 533, a first abutting wall 536 located above the plurality of first holding grooves 534, and a second abutting wall 537 located below the plurality of second locking grooves 535. The first holding grooves 534 extend forwardly through the first abutting wall 536. The second locking grooves 535 extend forwardly through the second abutting wall 537. The first protrusions 5122 are accommodated in the first holding grooves 534, and the second protrusions 5222 are accommodated in the second locking grooves 535 for assembly. The first abutting wall 536 abuts downwardly against the first protrusions 5122. The second abutting wall 537 abuts upwardly against the second protrusions 5222. Each first boss 532 defines a first recess 5321. Each second boss 533 defines a second recess 5331. The third soldering portion 5113 of the first ground terminal G1 is received in a corresponding first recess 5321. The fourth soldering portion 5213 of the second ground terminal G2 is received in a corresponding second recess 5331. The first ground terminals G1 and the second ground terminals G2 are in contact with the metal shielding member 53. As a result, all the first ground terminals G1 and all the second ground terminals G2 are connected in series with the metal shielding member 53 to form a whole, which improves the shielding effect. The first cables 513 include a plurality of first ground cables 5131 soldered or welded to the third soldering portions 5113 of the first ground terminals G1. The second cables 523 include a plurality of second ground cables 5231 soldered or welded to the fourth soldering portions 5213 of the second ground terminals G2. After molding, the covering insulating housing 54 wraps soldered or welded portions of the cables and the terminals, thereby improving the durability.

Referring to FIG. 30 to FIG. 33, in a second embodiment of the terminal module 5 disclosed in the present disclosure, the terminal module 5 further includes a metal shielding member 53 sleeved on the first insulating block 512 and the second insulating block 522. Preferably, the terminal module 5 further includes a covering insulating housing 54 overmolded on the first insulating block 512, the second insulating block 522 and the metal shielding member 53.

The metal shielding member 53 includes a main body 531, a plurality of first bosses 532 protruding upwardly from the main body 531, a plurality of second bosses 533 protruding downwardly from the main body 531, a plurality of first holding grooves 534 each located between two adjacent first bosses 532, a plurality of second locking grooves 535 each located between two adjacent second bosses 533, a first abutting wall 536 located above the plurality of first holding grooves 534, and a second abutting wall 537 located below the plurality of second locking grooves 535. The first holding grooves 534 extend forwardly through the first abutting wall 536. The second locking grooves 535 extend forwardly through the second abutting wall 537. The first protrusions 5122 are accommodated in the first holding grooves 534, and the second protrusions 5222 are accommodated in the second locking grooves 535 for assembly. The first abutting wall 536 abuts downwardly against the first protrusions 5122. The second abutting wall 537 abuts upwardly against the second protrusions 5222. Each first boss 532 defines a first recess 5321. Each second boss 533 defines a second recess 5331. The third soldering portion 5113 of the first ground terminal G1 is received in a corresponding first recess 5321. The fourth soldering portion 5213 of the second ground terminal G2 is received in a corresponding second recess 5331. The metal shielding member 53 includes a first pressing protrusion 5322 located above the first recesses 5321 and a second pressing protrusion 5332 located below the second recesses 5331. The first pressing protrusion 5322 abuts downwardly against the third soldering portions 5113 of the first ground terminals G1, and the second pressing protrusion 5332 abuts upwardly against the fourth soldering portions 5213 of the second ground terminals G2, in order to better contact the first ground terminals G1 and the second ground terminals G2 with the metal shielding member 53. As a result, all the first ground terminals G1 and all the second ground terminals G2 are connected in series with the metal shielding member 53 to form a whole, which improves the shielding effect. The first cables 513 include a plurality of first ground cables 5131 soldered or welded to the third soldering portions 5113 of the first ground terminals G1. The second cables 523 include a plurality of second ground cables 5231 soldered or welded to the fourth soldering portions 5213 of the second ground terminals G2. After molding, the covering insulating housing 54 wraps soldered or welded portions of the cables and the terminals, thereby improving the durability.

Figure 34:
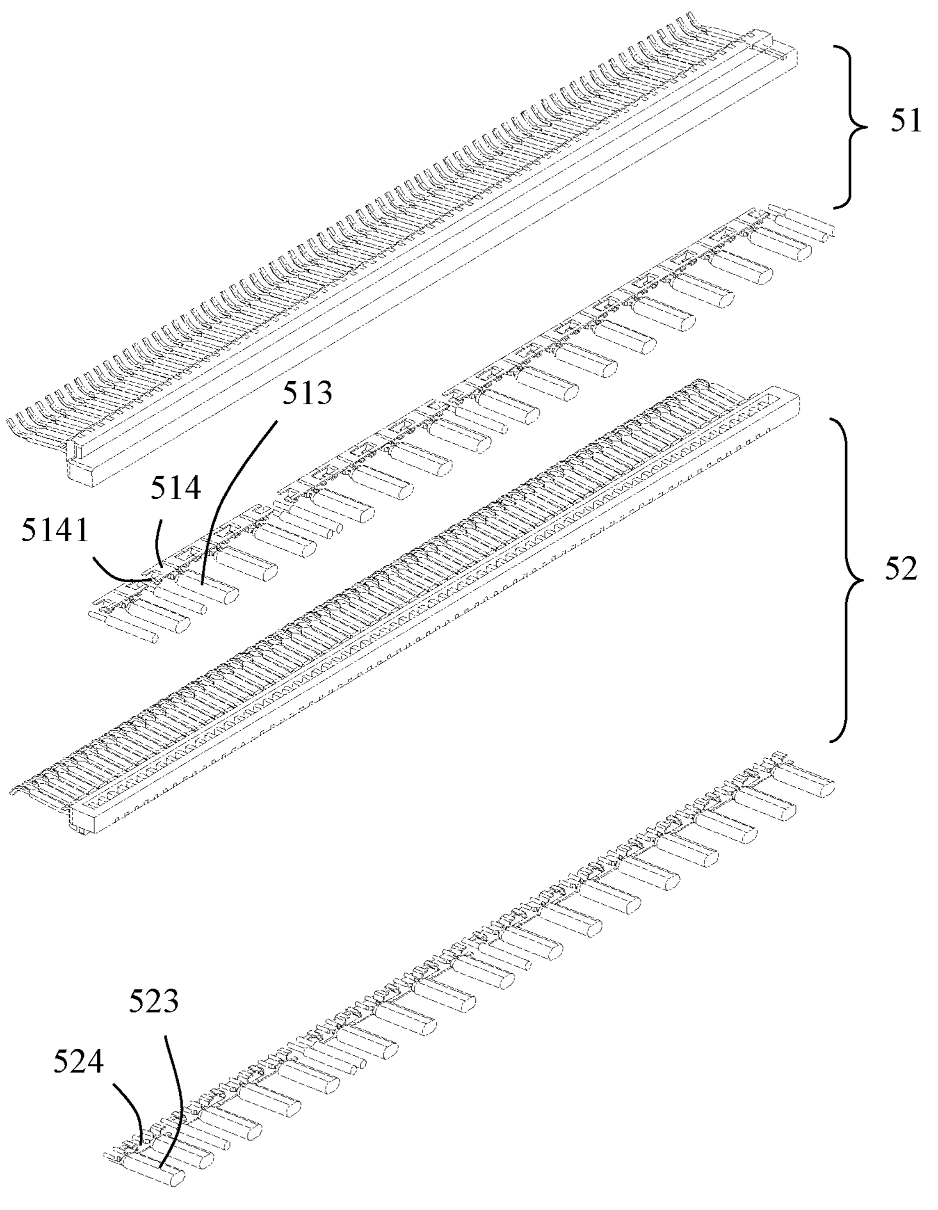
FIG. 34 is a partial perspective exploded view of the terminal module in accordance with a third embodiment thereof.
Figure 35:
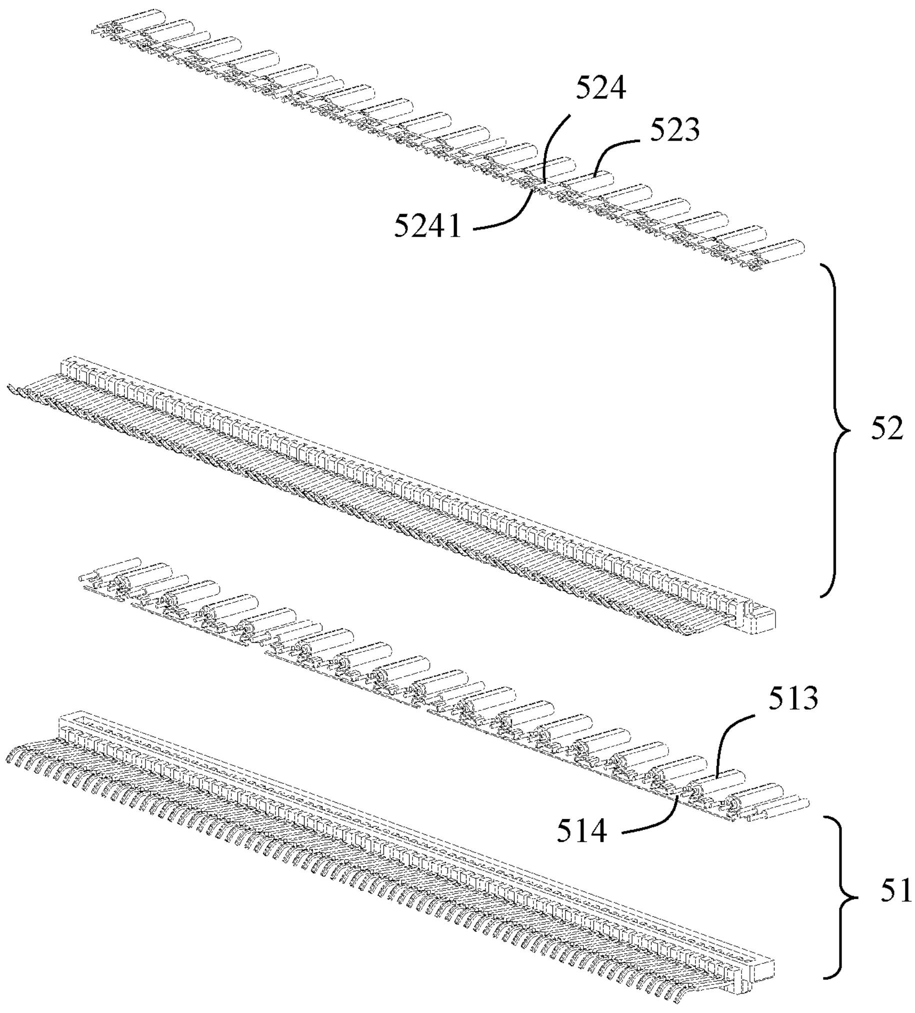
FIG. 35 is a partial perspective exploded view of FIG. 34 at another angle.

Referring to FIG. 34 and FIG. 35, in a third embodiment of the terminal module 5 of the present disclosure, the first terminal module 51 further includes a first ground piece 514 mounted to the first insulating block 512. The first ground piece 514 has a plurality of first protrusions 5141. The plurality of first protrusions 5141 are in contact with the plurality of first ground terminals G1 so as to connect all the first ground terminals G1 in series. The first cables 513 include a first ground cable 5131 soldered or welded to the first ground piece 514.

The second terminal module 52 further includes a second ground piece 524 mounted to the second insulating block 522. The second ground piece 524 has a plurality of second protrusions 5241. The plurality of second protrusions 5241 are in contact with the plurality of second ground terminals G2 so as to connect all the second ground terminals G2 in series. The second cables 523 includes a second ground cable 5231 soldered or welded to the second ground piece 524.

Figure 14:
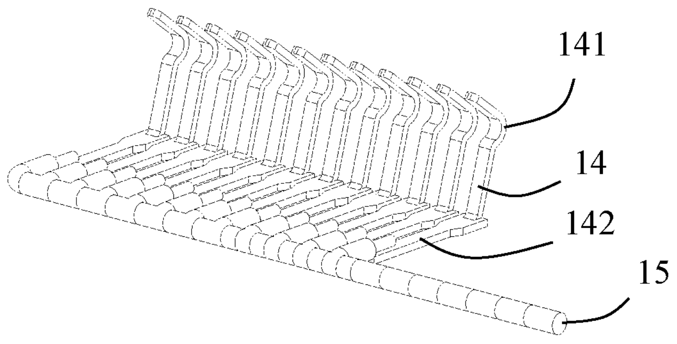
FIG. 14 is a schematic perspective view of identifying conductive terminals and a conductive element.
Figure 15:
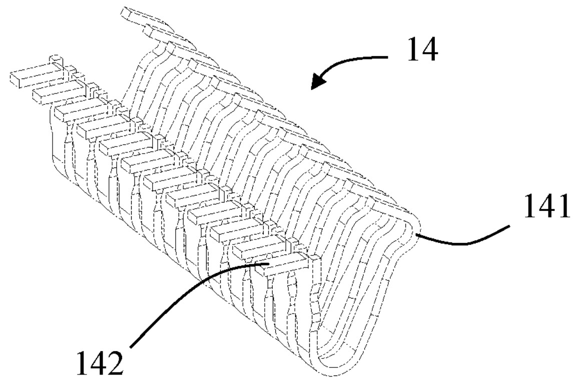
FIG. 15 is a schematic perspective view of the identifying conductive terminals of FIG. 14 in accordance with another embodiment of the present disclosure.
Figure 16:
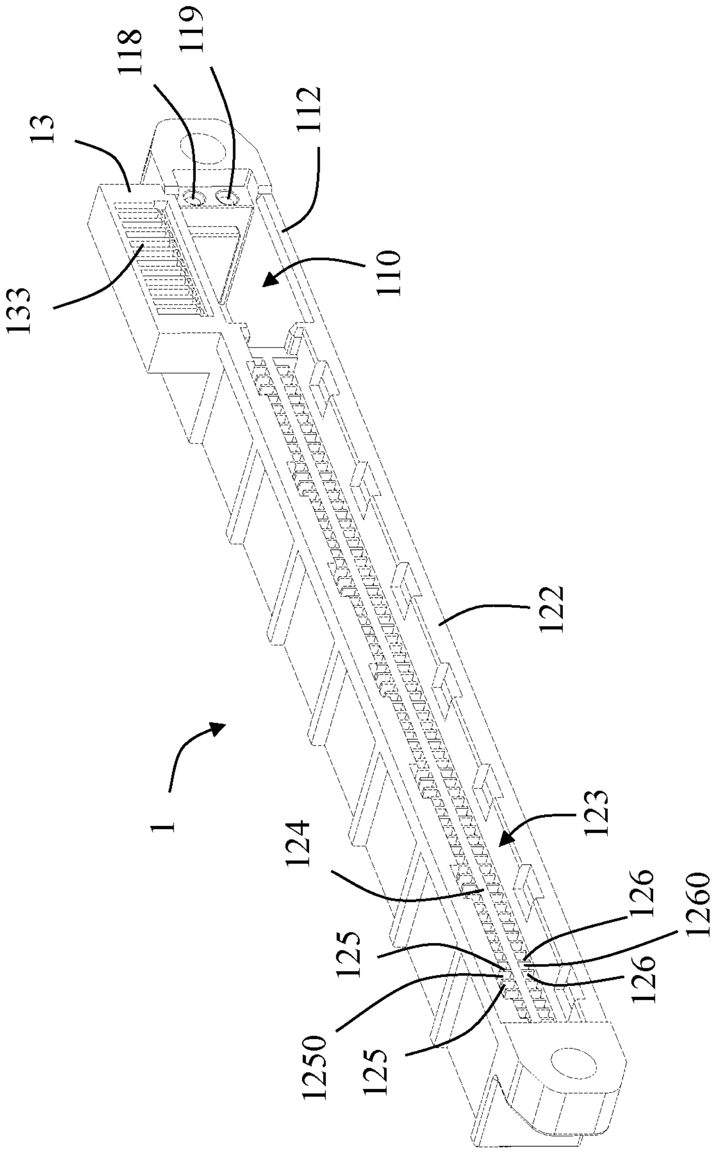
FIG. 16 is a perspective schematic view of an outer insulating body.

Referring to FIG. 12, the identification connector 103 includes the third base 13 of the outer insulating body 1, a plurality of identifying conductive terminals 14 fixed to the third base 13, and a conductive element 15. Each identifying conductive terminal 14 includes an elastic abutment arm 141 and a connecting portion 142. The elastic abutment arms 141 are configured to elastically contact the third row of conductive pads 2033 on the circuit board 200. Referring to FIG. 14 and FIG. 15, according to different implementations, the structure of the identifying conductive terminals 14 may be different. The plurality of identifying conductive terminals 14 are fixed to the third base 13 by assembling, or the identifying conductive terminals 14 are insert-molded with the third base 13. The conductive element 15 connects the connecting portions 142 of at least two identifying conductive terminals 14 among the plurality of identifying conductive terminals 14 so as to transmit an identification signal to the circuit board 200. In the illustrated embodiment of the present disclosure, the number of the identifying conductive terminals 14 is twelve. A distance between centerlines of any two adjacent identifying conductive terminals 14 among the plurality of identifying conductive terminals 14 is 1 mm. In the illustrated embodiment of the present disclosure, the conductive element 15 is a conductive wire. The electrical connector 100 further includes a covering housing 16 over-molded on the identification connector 103 and covering the connecting portions 142.

Figure 3:
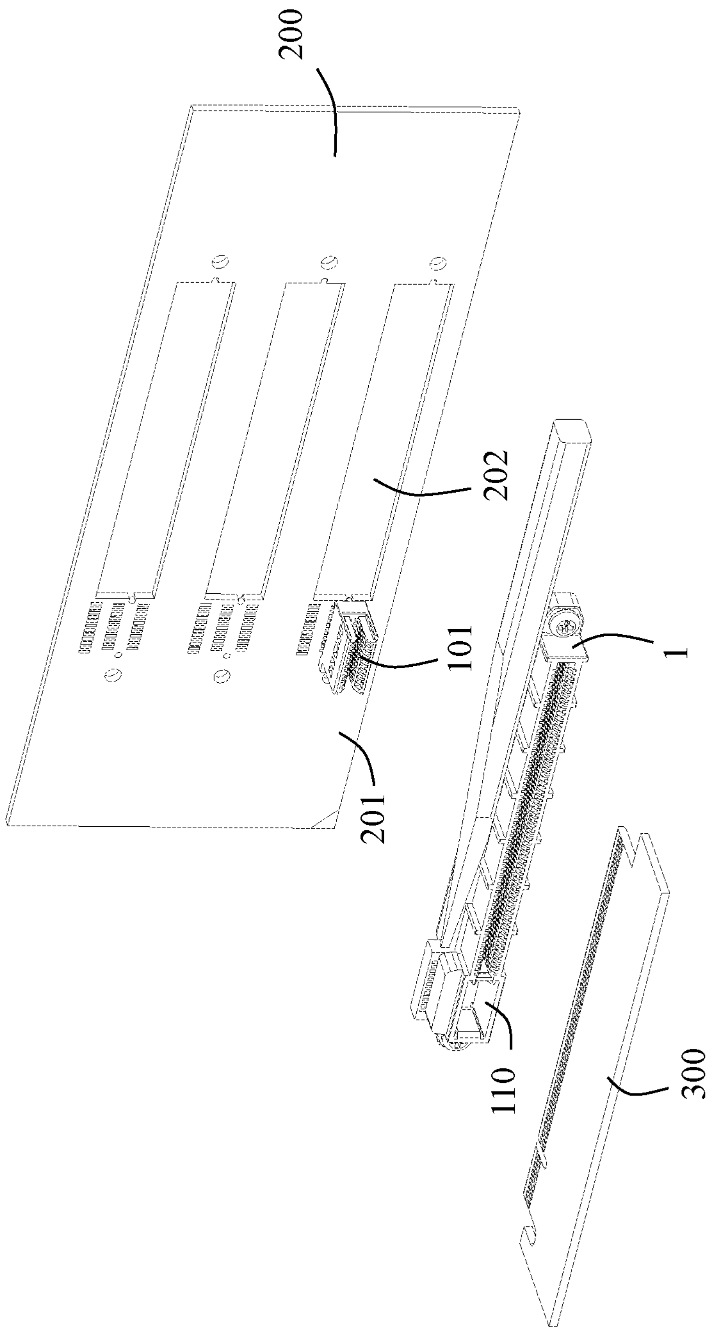
FIG. 3 is a partial perspective exploded view of FIG. 1.

Referring to FIG. 1, FIG. 3 and FIG. 4, the present disclosure also discloses a method for mounting the aforementioned electrical connector 100 to the circuit board 200. The method includes the following steps:

S1, mounting the first tail portions of the first terminals 42 of the first sub-connector 101 on the circuit board 200 (for example, the first tail portions are soldered or welded to the circuit board 200 by SMT), so as to realize the mounting of the first sub-connector 101;

S2, assembling the terminal module 5 into the outer insulating body 1; and

S3, mounting the outer insulating body 1 together with the terminal module 5 on the circuit board 200. The outer insulating body 1 is sleeved on the first sub-connector 101. The first insulating body 41 is accommodated in the accommodating space 110. In the step S3, the elastic abutment arms 141 of the identifying conductive terminals 14 are in elastic contact with the third row of conductive pads 2033 of the circuit board 200. Such arrangement reduces the difficulty of mounting various conductive terminals on the circuit board 200.

Preferably, after the step S3, the method of the present disclosure further includes the following step:

S4, fixing the outer insulating body 1 to the circuit board 200 by at least one fastener.

A superordinate concept of the first conductive terminal 42*a* and the second conductive terminal 42*b* is the first terminal 42. A superordinate concept of the first contact portion 42*a*21 and the second contact portion 42*b*21 is a first mating portion. A superordinate concept of the third contact portion 5112*a* and the fourth contact portion 5212*a* is a second mating portion. A superordinate concept of the first mating portion and the second mating portion is a mating portion. A superordinate concept of the first soldering portion 42*a*3 and the second soldering portion 42*b*3 is a first tail portion. A superordinate concept of the third soldering portion 5113 and the fourth soldering portion 5213 is a second tail portion. A superordinate concept of the first guide slot 1152, the second guide slot 1163, the third guide slot 1153 and the fourth guide slot 1164 is a guide slot. A superordinate concept of the first installation rib 4122, the second installation rib 4123, the third installation rib 4132 and the fourth installation rib 4133 is an installation rib. A superordinate concept of the third conductive terminal 511 and the fourth conductive terminal 521 is a second terminal. A superordinate concept of the first terminal 42 and the second terminal is a conductive terminal. A superordinate concept of the first tail portion and the second tail portion is a tail portion. A superordinate concept of the first cable 513 and the second cable 523 is a cable. A superordinate concept of the first sub-connector 101 and the second sub-connector 102 is a sub-connector. A superordinate concept of the first slot 410 and the second slot 120 is a slot. A superordinate concept of the first fastener 104 and the second fastener 105 is a fastener. Such logic can be applied to other components to define a corresponding superordinate concept.

Figure 6:
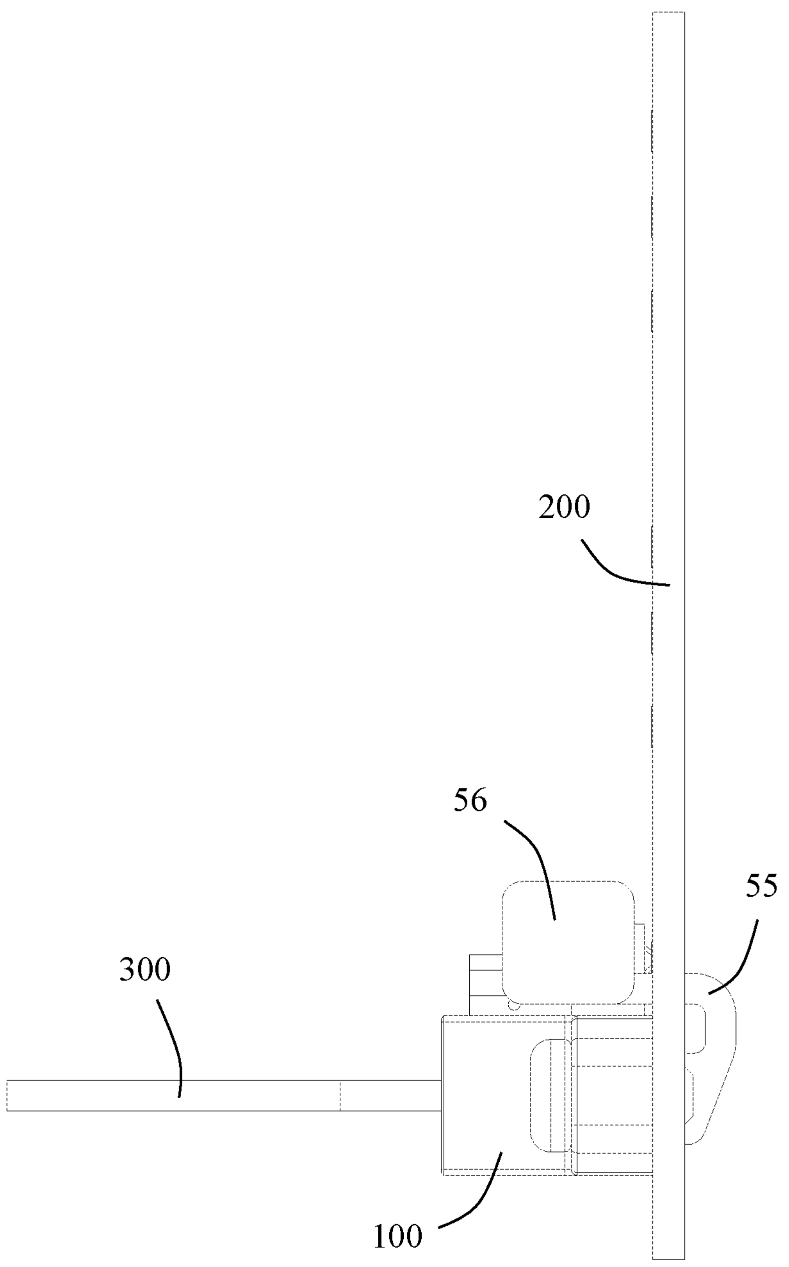
FIG. 6 is a right view of FIG. 1.
Figure 7:
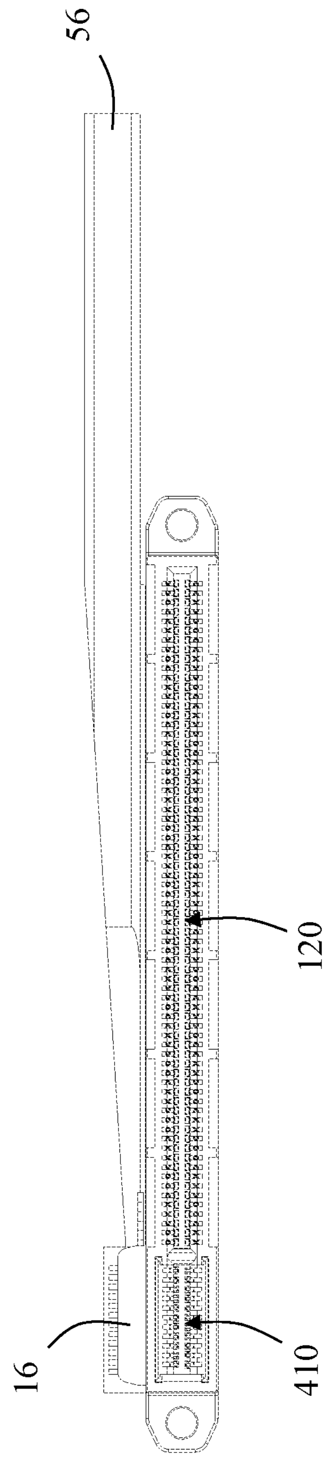
FIG. 7 is a front view of FIG. 1 with an electronic card and a circuit board removed therefrom.
Figure 8:
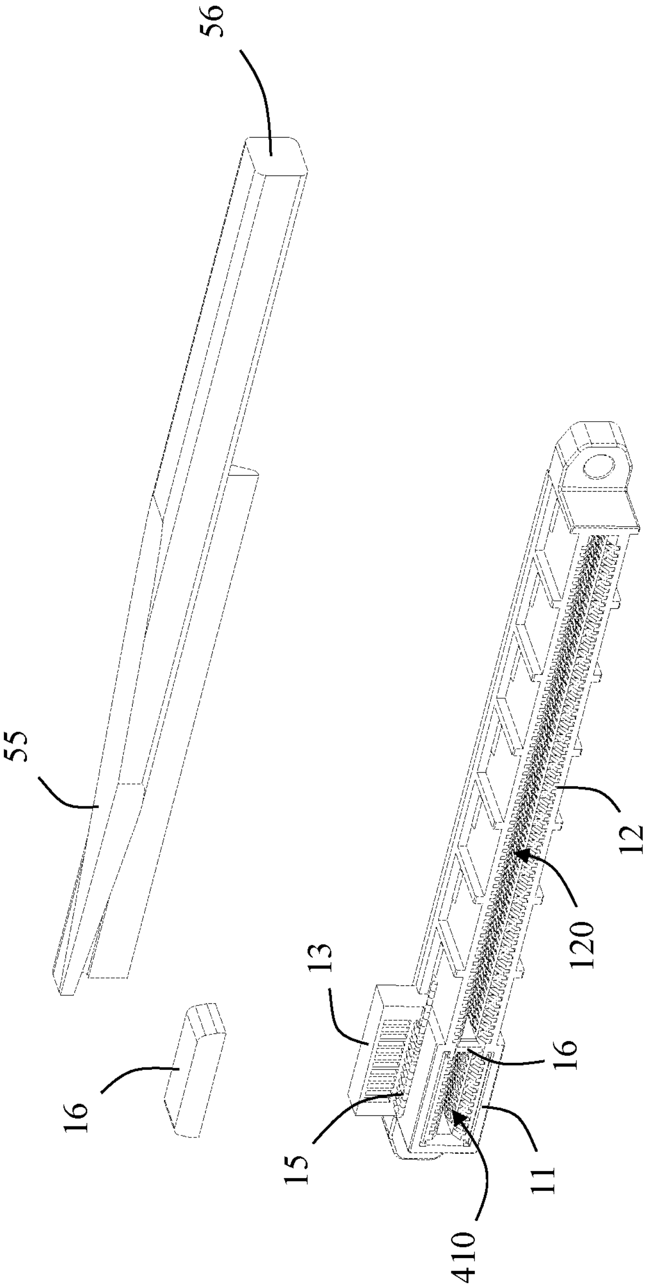
FIG. 8 is a partially exploded perspective view of an electrical connector in accordance with an embodiment of the present disclosure.
Figure 9:
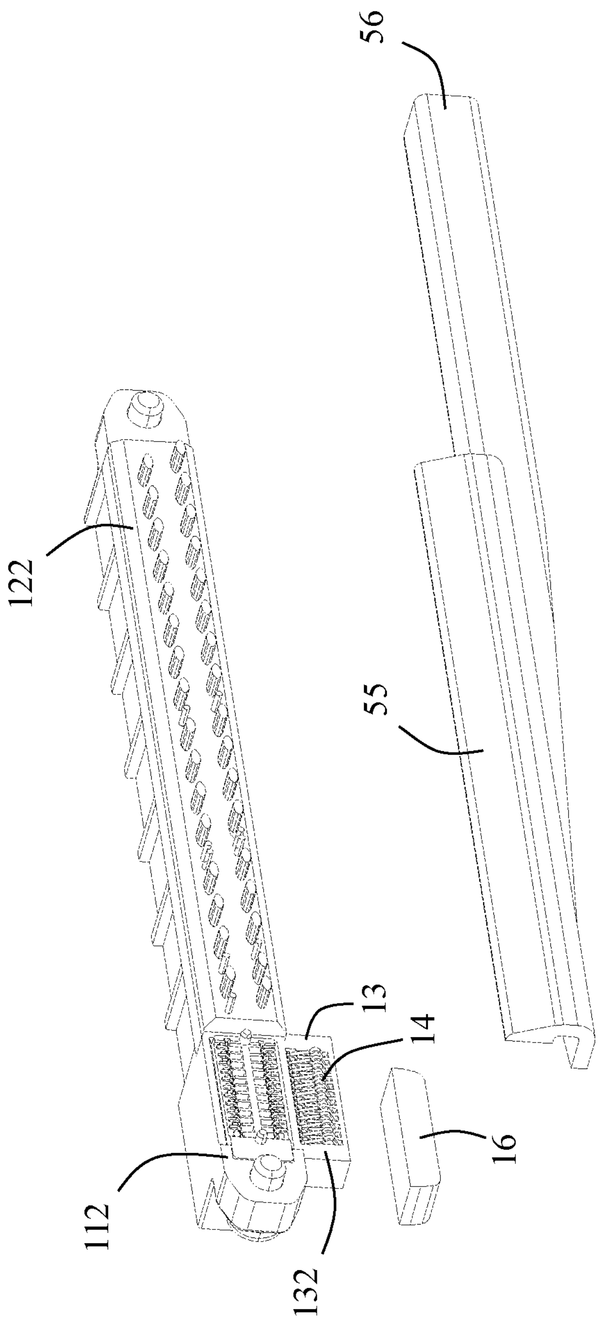
FIG. 9 is a partial perspective exploded view of FIG. 8 at another angle.
Figure 10:
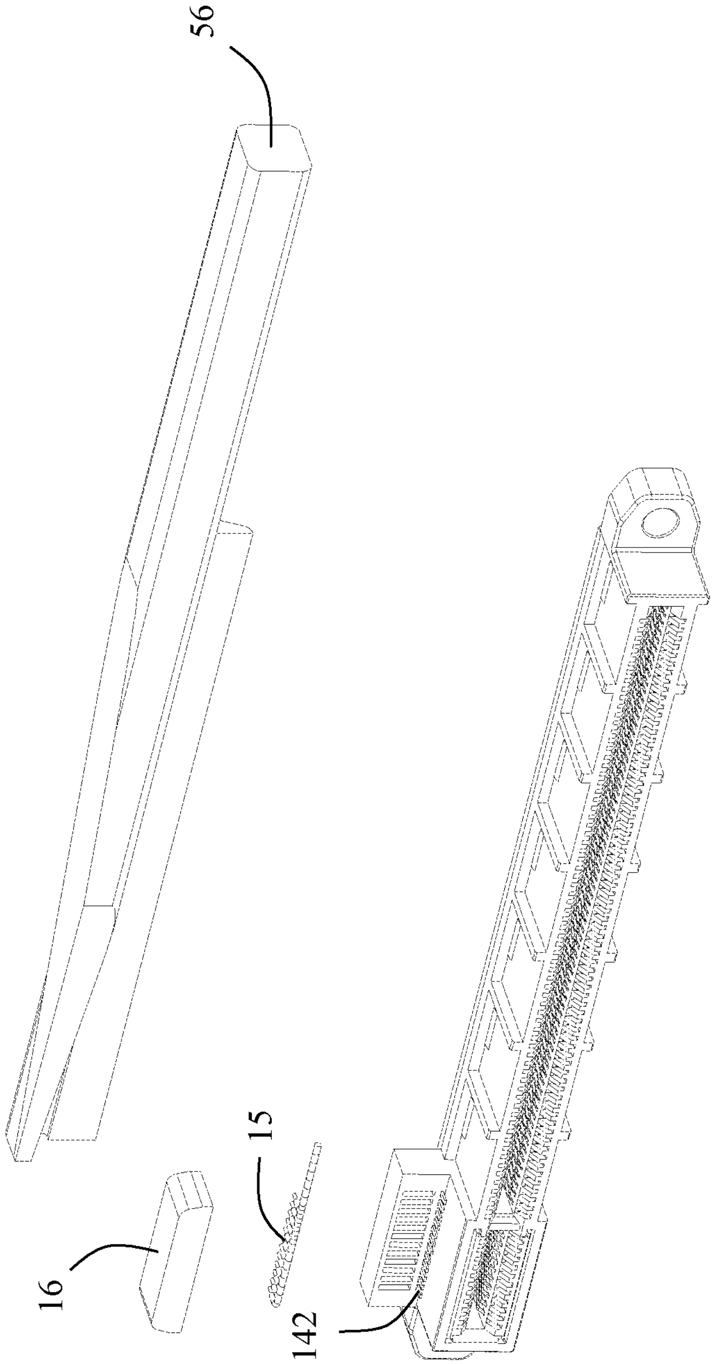
FIG. 10 is a further partial perspective exploded view of FIG. 8.
Figure 11:
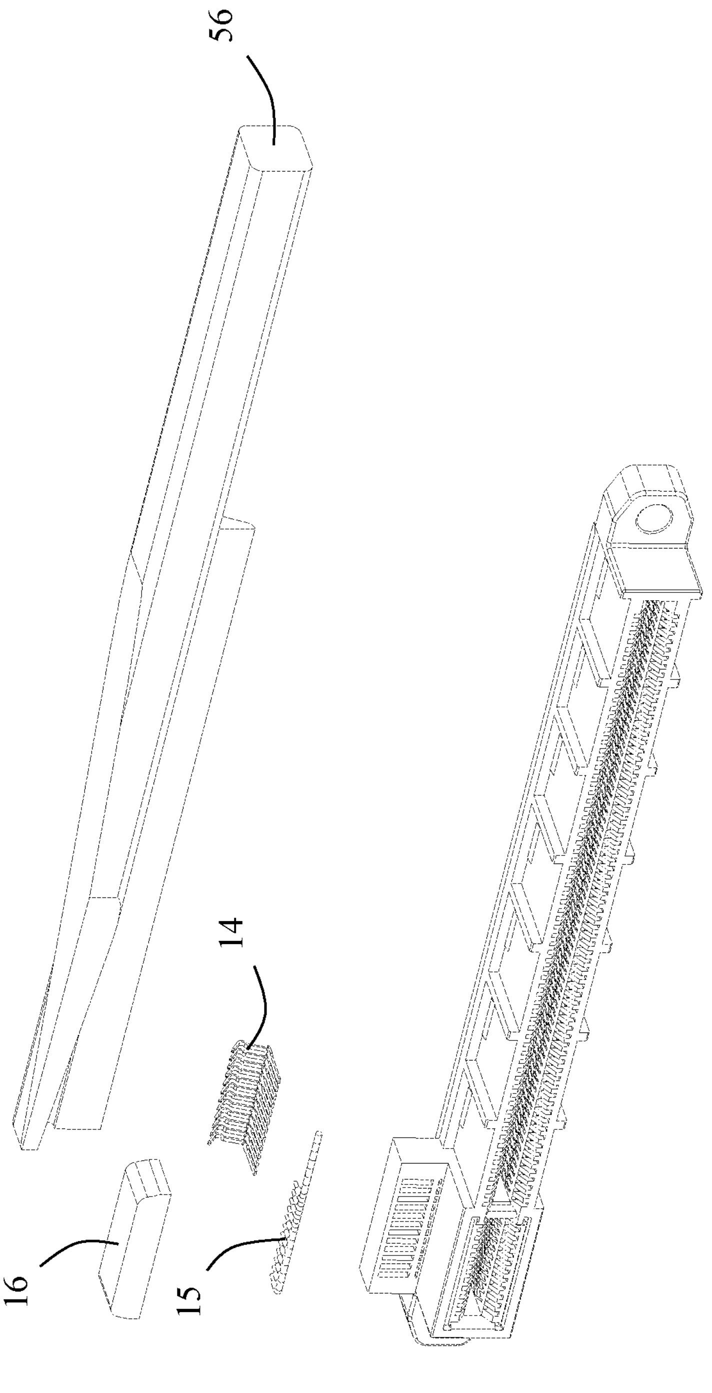
FIG. 11 is a further partial perspective exploded view of FIG. 10.

As shown in FIG. 4 and FIG. 6, schematically, the cables includes a bent portion 55 bent toward the second mating portion and a cable outlet portion 56 connected to the bent portion 55. The cable outlet portion 56 extends along the first direction A1-A1. In this way, by bending the cables forwardly, the cable outlet portion 56 is located in front of the mounting surface 201 of the circuit board 200. Therefore, the problem that the cables cannot be arranged due to insufficient space on a back of the circuit board 200 is avoided.

Compared with the prior art, the present disclosure pre-mounts the first sub-connector 101 on the circuit board 200; and then sleeves the outer insulating body 1 onto the first sub-connector 101 to make the first insulating body 41 be accommodated in the accommodating space 110 of the outer insulating body 1, which simplifies mounting the electrical connector 100 to the circuit board 200. Besides, by providing the identification connector 103 and connecting the connecting portions 142 of at least two identifying conductive terminals 14 among the plurality of identifying conductive terminals 1 through the conductive element 15, so as to transmit the identification signal to the circuit board 200, which expands the identification function of the electrical connector 100.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

an outer insulating body, the outer insulating body comprising an accommodating space and a second slot located beside the accommodating space along a first direction;

a first sub-connector, the first sub-connector comprising a first insulating body and a plurality of first terminals fixed to the first insulating body; the first insulating body defining a first slot; each first terminal comprising a first mating portion extending into the first slot and a first tail portion configured to be mounted on a circuit board; the outer insulating body being sleeved on the first sub-connector; the first insulating body being accommodated in the accommodating space; the first slot and the second slot being arranged along the first direction; and a terminal module, the terminal module comprising a plurality of second terminals and a plurality of cables connected to the plurality of second terminals, each second terminal comprising a second mating portion extending into the second slot and a second tail portion connected with a corresponding cable;

wherein the plurality of cables comprise a bent portion bent toward a direction of the second mating portion and a cable outlet portion connected to the bent portion; the cable outlet portion extends along the first direction.

2. The electrical connector according to claim 1, wherein the outer insulating body comprises a first base, the first base comprises a first mating surface and a first installation surface, the accommodating space extends through the first mating surface and the first installation surface;

the first base further comprises a first top wall, a first bottom wall, a first side wall connecting one side of the first top wall and one side of the first bottom wall, and a second side wall connecting another side of the first top wall and another side of the first bottom wall; the accommodating space is jointly enclosed by the first top wall, the first bottom wall, the first side wall and the second side wall.

3. The electrical connector according to claim 1, wherein the outer insulating body comprises a plurality of guide slots communicating with the accommodating space; the first insulating body comprises a plurality of installation ribs received in the guide slots; the guide slots comprise a first guide slot, a second guide slot flush with the first guide slot, a third guide slot located below the first guide slot, and a fourth guide slot flush with the third guide slot;

the first insulating body comprises a rear end portion, a first extension wall extending forwardly from a top of the rear end portion, and a second extension wall extending forwardly from a bottom of the rear end portion; the first slot is located between the first extension wall and the second extension wall;

the installation ribs comprise a first installation rib and a second installation rib provided on two sides of the first extension wall, respectively; and a third installation rib and a fourth installation rib provided on two sides of the second extension wall, respectively;

the first installation rib is clamped in the first guide slot; the second installation rib is clamped in the second guide slot; the third installation rib is clamped in the third guide slot; and the fourth installation rib is clamped in the fourth guide slot.

4. The electrical connector according to claim 3, wherein the first insulating body comprises a protruding wall connected to the rear end portion, a first post protruding forwardly from the protruding wall, and a second post protruding forwardly from the protruding wall;

the outer insulating body comprises a first fixing hole and a second fixing hole; wherein the first post is in interference fit with the first fixing hole, and the second post is in interference fit with the second fixing hole.

5. The electrical connector according to claim 1, wherein the first slot is configured to receive a first insertion portion of an electronic card; the second slot is configured to receive a second insertion portion of the electronic card; the first slot and the second slot have different widths in the first direction; the electrical connector is further provided with a positioning wall located between the first slot and the second slot; the positioning wall is configured to be received in a cutout of the electronic card; and the cutout is located between the first insertion portion and the second insertion portion.

6. The electrical connector according to claim 1, wherein the plurality of first terminals comprise a plurality of first conductive terminals and a plurality of second conductive terminals;

each first conductive terminal comprises a first fixing portion fixed to the first insulating body, a first elastic arm extending forwardly from one end of the first fixing portion, and a first soldering portion bent from another end of the first fixing portion; the first elastic arm is provided with a first contact portion extending into the first slot;

each second conductive terminal comprises a second fixing portion fixed to the first insulating body, a second elastic arm extending forwardly from one end of the second fixing portion, and a second soldering portion bent from another end of the second fixing portion; the second elastic arm is provided with a second contact portion extending into the first slot;

the first mating portion comprises the first contact portions and the second contact portions; the first tail portion comprises the first soldering portions and the second soldering portions; and the first soldering portions and the second soldering portions are fixed to the circuit board by surface mount technology.

7. The electrical connector according to claim 1, wherein the outer insulating body comprises a second base, the second base comprises a second mating surface and a second installation surface, the second slot extends forwardly through the second mating surface, the second base further comprises an installation space extending backwardly through the second installation surface;

the second base comprises a middle transverse wall exposed backwardly in the installation space, a plurality of first fence portions protruding upwardly from the middle transverse wall and arranged at intervals along the first direction, and a plurality of second fence portions protruding downwardly from the middle transverse wall and arranged at intervals along the first direction; a plurality of first receiving grooves of which each is provided between each two adjacent first fence portions, the first receiving grooves are arranged at intervals along the first direction; a plurality of second receiving grooves of which each is provided between each two adjacent second fence portions, and the second receiving grooves are arranged at intervals along the first direction.

8. The electrical connector according to claim 7, wherein the terminal module comprises a first terminal module and a second terminal module, the first terminal module comprises a plurality of third conductive terminals, a first insulating block fixing the third conductive terminals, and a plurality of first cables connected to the plurality of third conductive terminals; each third conductive terminal comprises a third fixing portion fixed in the first insulating block, a third elastic arm extending from one end of the third fixing portion, and a third soldering portion extending from another end of the third fixing portion; the third elastic arm passes through a corresponding first receiving groove to extend into the second slot; the third elastic arm comprises a third contact portion located in the second slot;

the second terminal module comprises a plurality of fourth conductive terminals, a second insulating block fixing the fourth conductive terminals, and a plurality of second cables connected to the plurality of fourth conductive terminals; each fourth conductive terminal comprises a fourth fixing portion fixed in the second insulating block, a fourth elastic arm extending from one end of the fourth fixing portion, and a fourth soldering portion extending from another end of the fourth fixing portion; the fourth elastic arm passes through a corresponding second receiving groove to extend into the second slot; the fourth elastic arm comprises a fourth contact portion located in the second slot;

the first insulating block and the second insulating block are at least partially accommodated in the installation space; the first insulating block and/or the second insulating block is positioned in contact with the middle transverse wall;

the second mating portion comprises the third contact portions and the fourth contact portions; the second tail portion comprises the third soldering portions and the fourth soldering portions.

9. The electrical connector according to claim 1, wherein the terminal module comprises a first terminal module and a second terminal module, the first terminal module comprises a plurality of third conductive terminals, a first insulating block fixing the third conductive terminals, and a plurality of first cables connected to the plurality of third conductive terminals; each third conductive terminal comprises a third fixing portion fixed in the first insulating block, a third elastic arm extending from one end of the third fixing portion, and a third soldering portion extending from another end of the third fixing portion; the third elastic arm passes through a corresponding first receiving groove to extend into the second slot; the third elastic arm comprises a third contact portion located in the second slot;

the second terminal module comprises a plurality of fourth conductive terminals, a second insulating block fixing the fourth conductive terminals, and a plurality of second cables connected to the plurality of fourth conductive terminals; each fourth conductive terminal comprises a fourth fixing portion fixed in the second insulating block, a fourth elastic arm extending from one end of the fourth fixing portion, and a fourth soldering portion extending from another end of the fourth fixing portion; the fourth elastic arm passes through a corresponding second receiving groove to extend into the second slot; the fourth elastic arm comprises a fourth contact portion located in the second slot;

the plurality of third conductive terminals comprise a plurality of first signal terminals and a plurality of first ground terminals;

the plurality of fourth conductive terminals comprise a plurality of second signal terminals and a plurality of second ground terminals;

the terminal module further comprises a metal shielding member sleeved on the first insulating block and the second insulating block; the metal shielding member comprises a plurality of first recesses and a plurality of second recesses; wherein the third soldering portions of the first ground terminals are accommodated in corresponding first recesses; the fourth soldering portions of the second ground terminals are accommodated in corresponding second recesses; the first ground terminals and the second ground terminals are in contact with the metal shielding member;

the plurality of first cables comprise a plurality of first ground cables fixed to the third soldering portions of the first ground terminals; the plurality of second cables comprise a plurality of second ground cables fixed to the fourth soldering portions of the second ground terminals.

10. The electrical connector according to claim 9, wherein the first insulating block comprises a plurality of first protrusions; the second insulating block comprises a plurality of second protrusions;

the metal shielding member comprises a plurality of first holding grooves for accommodating the plurality of first protrusions, and a first abutting wall located above the plurality of first holding grooves; the first abutting wall is configured to abut downwardly against the plurality of first protrusions;

the metal shielding member comprises a plurality of second holding grooves for accommodating the plurality of second protrusions, and a second abutting wall located below the plurality of second holding grooves; the second abutting wall is configured to abut upwardly against the plurality of second protrusions.

11. The electrical connector according to claim 9, wherein the metal shielding member comprises a first pressing protrusion located above the first recesses, and a second pressing protrusion located below the second recesses; and wherein the first pressing protrusion abuts downwardly against the third soldering portions of the first ground terminals; the second pressing protrusion abuts upwardly against the fourth soldering portions of the second ground terminals.

12. The electrical connector according to claim 1, wherein the terminal module comprises a first terminal module and a second terminal module; the first terminal module comprises a plurality of third conductive terminals, a first insulating block fixing the third conductive terminals, a first ground piece mounted to the first insulating block, and a plurality of first cables connected to the plurality of third conductive terminals; each third conductive terminal comprises a third fixing portion fixed in the first insulating block, a third elastic arm extending from one end of the third fixing portion, and a third soldering portion extending from another end of the third fixing portion; the third elastic arm passes through a corresponding first receiving groove to extend into the second slot; the third elastic arm comprises a third contact portion located in the second slot;

the second terminal module comprises a plurality of fourth conductive terminals, a second insulating block fixing the fourth conductive terminals, a second ground piece mounted to the second insulating block, and a plurality of second cables connected to the plurality of fourth conductive terminals; each fourth conductive terminal comprises a fourth fixing portion fixed in the second insulating block, a fourth elastic arm extending from one end of the fourth fixing portion, and a fourth soldering portion extending from another end of the fourth fixing portion; the fourth elastic arm passes through a corresponding second receiving groove to extend into the second slot; the fourth elastic arm comprises a fourth contact portion located in the second slot;

the plurality of third conductive terminals comprise a plurality of first signal terminals and a plurality of first ground terminals; the first ground piece is in contact with the plurality of first ground terminals to connect the plurality of first ground terminals in series; the first cables comprise a first ground cable fixed to the first ground piece;

the plurality of fourth conductive terminals comprise a plurality of second signal terminals and a plurality of second ground terminals; the second ground piece is in contact with the plurality of second ground terminals to connect the plurality of second ground terminals in series; the second cables comprise a second ground cable fixed to the second ground piece.

13. The electrical connector according to claim 1, wherein the outer insulating body comprises a third base; the electrical connector further comprises a plurality of identifying conductive terminals fixed to the third base; each identifying conductive terminal comprises an elastic abutment arm protruding from the third base; and the elastic abutment arm is configured to be in elastic contact with a corresponding conductive pad on the circuit board.

14. An electrical connector, comprising:

a sub-connector, the sub-connector comprising an insulating body and a plurality of conductive terminals, the insulating body defining a slot, each conductive terminal comprising a tail portion and a mating portion protruding into the slot, the slot being configured to receive an electronic card; and an identification connector, the identification connector comprising a plurality of identifying conductive terminals and a conductive element; each identifying conductive terminal comprising a connecting portion; the plurality of identifying conductive terminals being configured to be in contact with a circuit board; wherein the conductive element connects the connecting portions of at least two of the identifying conductive terminals among the plurality of identifying conductive terminals, so as to transmit an identification signal to the circuit board.

15. The electrical connector according to claim 14, wherein the sub-connector comprises a first sub-connector, the insulating body comprises a first insulating body, the conductive terminals comprise a plurality of first terminals fixed to the first insulating body, the slot comprises a first slot arranged on the first insulating body, the mating portion comprises a first mating portion extending into the first slot, the tail portion comprises a first tail portion for being mounted to the circuit board;

the plurality of first terminals located on a same side of the first slot are arranged at intervals along a first direction;

the identification connector is disposed adjacent to the first sub-connector along a second direction which is perpendicular to the first direction.

16. The electrical connector according to claim 15, wherein the insulating body further comprises an outer insulating body, the plurality of identifying conductive terminals are fixed to the outer insulating body, the outer insulating body comprises an accommodating space and a second slot located beside the accommodating space along the first direction, the outer insulating body is sleeved on the first sub-connector, the first insulating body is accommodated in the accommodating space, and the first slot and the second slot are disposed along the first direction.

17. The electrical connector according to claim 16, wherein the sub-connector comprises a second sub-connector, the second sub-connector comprises the outer insulating body and a terminal module assembled to the outer insulating body; the terminal module comprises a plurality of second terminals and a plurality of cables connected to the second terminals; each second terminal comprises a second mating portion extending into the second slot and a second tail portion connected to the cable.

18. The electrical connector according to claim 14, wherein each identifying conductive terminal comprises an elastic abutment arm, and the elastic abutment arm is configured to be in elastic contact with a corresponding conductive pad on the circuit board.

19. A method for mounting an electrical connector to a circuit board, the electrical connector comprising:

an outer insulating body, the outer insulating body comprising an accommodating space and a second slot located beside the accommodating space along a first direction;

a first sub-connector, the first sub-connector comprising a first insulating body and a plurality of first terminals fixed to the first insulating body; the first insulating body defining a first slot; each first terminal comprising a first mating portion extending into the first slot and a first tail portion configured to be mounted on the circuit board; the outer insulating body being sleeved on the first sub-connector; the first insulating body being accommodated in the accommodating space; the first slot and the second slot being arranged along the first direction; and a terminal module, the terminal module comprising a plurality second terminals and a plurality of cables connected to the plurality of second terminals, each second terminal comprising a second mating portion extending into the second slot and a second tail portion connected with a corresponding cable;

the method comprising steps of:

S1, mounting the first tail portions of the first terminals of the first sub-connector on the circuit board;

S2, assembling the terminal module into the outer insulating body; and

S3, mounting the outer insulating body together with the terminal module on the circuit board, wherein the first insulating body is accommodated in the accommodating space.

20. The method according to claim 19, further comprising a following step after the step S3:

S4, fixing the outer insulating body to the circuit board by a fastener.

* * * * *